(12) United States Patent
Nakahara et al.

(10) Patent No.: US 8,357,262 B2
(45) Date of Patent: Jan. 22, 2013

(54) CORROSION-RESISTANT MEMBER, TREATMENT APPARATUS AND SAMPLE TREATMENT METHOD USING THE MEMBER, AND METHOD FOR MANUFACTURE OF CORROSION-RESISTANT MEMBER

(75) Inventors: Masahiro Nakahara, Kagoshima (JP);
Tetsuji Hayasaki, Kagoshima (JP);
Yoshihiro Okawa, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 1274 days.

(21) Appl. No.: 12/065,276

(22) PCT Filed: Aug. 30, 2006

(86) PCT No.: PCT/JP2006/317059
§ 371 (c)(1),
(2), (4) Date: May 28, 2008

(87) PCT Pub. No.: WO2007/026739
PCT Pub. Date: Mar. 8, 2007

(65) Prior Publication Data
US 2008/0283499 A1 Nov. 20, 2008

(30) Foreign Application Priority Data

Aug. 31, 2005 (JP) ................................ 2005-251983

(51) Int. Cl.
*C04B 35/10* (2006.01)
*H01L 21/306* (2006.01)
*C23C 16/00* (2006.01)

(52) U.S. Cl. .................... 156/345.1; 216/67; 118/723 R; 427/569; 501/119; 501/127

(58) Field of Classification Search .................... None
See application file for complete search history.

(56) References Cited

U.S. PATENT DOCUMENTS 4,511,402 A * 4/1985 Miura et al. .................... 75/233
4,652,413 A * 3/1987 Tiegs ............................. 264/640
4,732,719 A * 3/1988 Panda et al. ................... 264/664
4,848,984 A * 7/1989 Ezis et al. ....................... 51/309

(Continued)

FOREIGN PATENT DOCUMENTS

JP 08-081257 A 3/1996
JP 11-335159 A 12/1999

(Continued)

OTHER PUBLICATIONS

Office Action issued on May 29, 2012 in corresponding JP Patent Application No. 2007-533276.

*Primary Examiner* — Allan Olsen
(74) *Attorney, Agent, or Firm* — Birch, Stewart, Kolasch & Birch, LLP

(57) ABSTRACT

Disclosed is a corrosion resistant member comprising a sintered material having an $\alpha$-$Al_2O_3$ crystal and an YAG (yttrium-aluminum-garnet) crystal. The corrosion resistant member contains metal elements, 70 to 98% by mass (inclusive) of Al in terms of $Al_2O_3$ and 2 to 30% by mass of Y in terms of $Y_2O_3$. The corrosion resistant member has a peak intensity ratio $I_{116}/I_{104}$ within the range from 0.94 to 1.98, preferably. 2.21 or higher, wherein $I_{116}$ and $I_{104}$ represent peak intensities attributed to the (116) face and the (104) face, respectively, of an $\alpha$-$Al_2O_3$ crystal as measured by X-ray diffractometry on its surface layer.

16 Claims, 6 Drawing Sheets

U.S. PATENT DOCUMENTS

| | | | | |
|---|---|---|---|---|
| 4,946,808 | A | * | 8/1990 | Wei et al. .................. 501/95.3 |
| 6,844,285 | B1 | * | 1/2005 | Wei ............................ 501/152 |
| 2006/0183625 | A1 | * | 8/2006 | Miyahara .................. 501/98.4 |
| 2008/0145649 | A1 | * | 6/2008 | Mannem et al. ............ 428/336 |

FOREIGN PATENT DOCUMENTS

| | | |
|---|---|---|
| JP | 2002-37660 A | 2/2002 |
| JP | 2002-307660 A | 2/2002 |
| JP | 2002-255634 A | 9/2002 |
| JP | 2002-255634 A | 9/2002 |
| JP | 2003-297906 A | 10/2003 |
| JP | 2003-297906 A | 10/2003 |
| JP | 2005-154262 A | 6/2005 |
| JP | 2005-154262 A | 6/2005 |
| WO | WO-2005/009919 A1 | 2/2005 |
| WO | WO-2005/009919 A1 | 2/2005 |

* cited by examiner

CORROSION-RESISTANT MEMBER, TREATMENT APPARATUS AND SAMPLE TREATMENT METHOD USING THE MEMBER, AND METHOD FOR MANUFACTURE OF CORROSION-RESISTANT MEMBER

RELATED APPLICATIONS

This application is the national stage application of International Application No. PCT/JP2006/317059 filed on Aug. 30, 2006. This application also claims priority under 35 USC §119(a)-(d) of Japanese Application No. 2005-251983 filed in the JPO on Aug. 31, 2005.

TECHNICAL FIELD

The present invention relates to a corrosion-resistant member comprising a sintered body that contains alumina and yttrium aluminum garnet (YAG), a treatment apparatus (e.g., etching apparatuses or film deposition apparatuses such as CVD apparatuses) and a sample treatment method using the corrosion-resistant member, and a method for manufacturing the corrosion-resistant member. More specifically, the corrosion-resistant member can be used as components etching apparatuses or deposition apparatuses for use in the production of semiconductors or liquid crystals, such as inner wall materials (chambers), microwave transparent windows, showerheads, focus rings, shield rings, clamping rings, and electrostatic chucks, or as components in cryopumps and turbo-molecular pumps.

BACKGROUND ART

In recent years, plasma treatment techniques have widely been used to treat objects in an etching process and a deposition process in the production of semiconductors and liquid crystals. A reactive and corrosive gas containing a halogen element, such as fluorine or chlorine, has frequently been used in an etching process and a deposition process. High corrosion resistance is therefore required for members having a corrosion-resistant surface, which comes into contact with a corrosive gas or its plasma in treatment apparatuses, such as etching apparatuses and coating apparatuses, for use in the production of semiconductors and liquid crystals. Members having such a high corrosion resistance (corrosion-resistant members) have been formed of a ceramic, such as sintered alumina.

Recently, sintered yttrium aluminum garnet (YAG) has received attention as a sintered ceramic having a corrosion resistance higher than that of sintered alumina. Although the sintered YAG has a corrosion resistance higher than that of sintered alumina, however, the sintered YAG generally has much lower mechanical properties, such as the bending strength and the fracture toughness, than sintered alumina. The sintered YAG is therefore difficult to apply to corrosion-resistant members that require excellent mechanical properties as well as a high corrosion resistance. Thus, sintered bodies that contain alumina and YAG and have mechanical properties superior to that of sintered YAG and a corrosion resistance higher than that of sintered alumina have received attention as corrosion-resistant members (see, for example, Patent Documents 1 to 4).

For example, Patent Document 1 discloses a ceramic composite that has a uniform sea-island structure containing a polycrystalline $\alpha$-$Al_2O_3$ as the sea and polycrystalline YAG as the island. This ceramic composite has no colony and has a three-point bending strength of at least 500 MPa at 1500° C. in the air. Such a ceramic composite may be formed as follows: first, an $\alpha$-$Al_2O_3$ powder and an $Y_2O_3$ powder are dry-blended or wet-blended at a desired ratio to prepare a mixed powder, the mixed powder is then melted in a known melting furnace, such as an arc melting furnace, at a temperature, for example, in the range of 1800° C. to 2500° C., and the melt is directly poured into a crucible, and is solidified in one direction to form the ceramic composite described above.

Patent Document 2 discloses a plasma-resistant sintered alumina. A main component $Al_2O_3$ has a particle size in the range of 10 to 40 µm, and YAG in the $Al_2O_3$ has an average grain size in the range of 0.1 to 1 µm. The number of YAG crystal grains is at least 20 in a 10 µm×10 µm area. This plasma-resistant sintered alumina is formed by molding and firing a raw material containing 100 parts by weight of $Al_2O_3$, 1 to 10 parts by weight of Y compound in terms of $Y_2O_3$, and 0.01 to 0.1 parts by weight of Mg compound in terms of MgO. The raw material is heated to 1600° C. at a heating rate in the range of 10° C. to 100° C./h, and is fired at a temperature in the range of 1600° C. to 1850° C. in a reducing atmosphere. The Y compound is an yttrium oxide precursor, such as yttrium chloride, yttrium acetate, or yttrium nitrate. The Mg compound is magnesium sulfate or magnesium nitrate. Use of these compounds allows Y or Mg to disperse well in the alumina composition, can prevent the selective corrosion of $Al_2O_3$ and deterioration in mechanical properties of a sintered body, and can improve the plasma resistance.

Patent Document 3 discloses a high-strength sintered alumina that contains 50% to 97% by weight of alumina and 3% to 50% by weight of YAG. The alumina has an average grain size in the range of 2 to 10 µm. The YAG has an average grain size in the range of 1.5 to 5 µm. The ratio of the average grain size of the alumina to the average grain size of the YAG is more than one and less than seven. The high-strength sintered alumina is produced by firstly mixing 50% to 97% by weight of alumina powder and 3% to 50% by weight of YAG powder. The alumina powder has a purity of at least 95%, an average particle size in the range of 1 to 15 µm, and a BET specific surface area in the range of 1 to 4 $m^2/g$. The YAG powder has an average particle size in the range of 0.6 to 1.2 µm and a BET specific surface area in the range of 2 to 5 $m^2/g$. The mixed powder is then mixed with an organic binder. The mixed powder is then granulated, molded, and fired to form the high-strength sintered alumina.

Patent Document 4 discloses a high-strength and high-hardness alumina ceramic that contains 0.5% to 12% by weight of YAG particles and the remainder substantially composed of alumina. YAG crystals have an average grain size in the range of 0.05 to 1.5 µm. The alumina has an average grain size in the range of 0.5 to 5.0 µm. YAG crystal grains are dispersed within a grain boundary of a sintered body and within an alumina particle. The alumina ceramic may be formed as follows: first, a water-soluble aluminum salt and a water-soluble yttrium salt are dissolved in water to prepare a solution, an alumina powder is then added to the solution, the solution is subjected to a neutralization reaction with ammonia to form a mixed powder composed of Al—Y hydroxide and alumina, the mixed powder is then calcined at a temperature in the range of 300° C. to 1000° C. to produce an alumina powder in which YAG particles are dispersed, and the alumina powder is granulated, molded, and fired to form the alumina ceramic described above.

Patent Document 1: Japanese Unexamined Patent Application Publication No. 8-81257

Patent Document 2: Japanese Unexamined Patent Application Publication No. 2002-37660

Patent Document 3: Japanese Unexamined Patent Application Publication No. 2002-255634

Patent Document 4: Japanese Unexamined Patent Application Publication No. 11-335159

DISCLOSURE OF INVENTION

Problems to be Solved by the Invention

A ceramic composite according to Patent Document 1 is produced by melting a mixed powder of an $\alpha\text{-}Al_2O_3$ powder and an $Y_2O_3$ powder and rapidly solidifying the melt in one direction. YAG crystals and alumina crystals grow together in the direction of solidification as acicular or rod-like crystals, thus forming huge crystals (several tens of micrometers or more in the longitudinal direction). Thus, crystals are likely to segregate over the entire ceramic. The YAG content may differ in different portions of the ceramic. Consequently, when the ceramic composite is used as a corrosion-resistant member to be exposed to a corrosive gas containing a halogen element, the ceramic composite has a tendency to have different corrosion resistances in different portions. Such a ceramic composite has $\alpha\text{-}Al_2O_3$ crystal peaks at (012), (110), (024), and (211) planes in an X-ray diffraction chart. Thus, a polycrystalline $\alpha\text{-}Al_2O_3$ portion in the sintered body has a crystal structure completely different from that of conventional $\alpha\text{-}Al_2O_3$. Such a crystal structure is thought to be responsible for the corrosion resistance inferior to those of conventional materials.

A plasma-resistant sintered alumina according to Patent Document 2 is produced by firing a mixture of an alumina powder and an yttrium oxide precursor powder (an yttrium chloride powder, an yttrium acetate powder, or an yttrium nitrate powder). In a firing process, the yttrium oxide precursor is converted into yttrium oxide particles, which in turn react with alumina particles to form YAG particles. The YAG particles grow by sintering. Alumina particles that do not react with the yttrium oxide particles have a tendency to grow after the sintering of YAG particles. Thus, the YAG crystals grown by sintering agglomerate easily. In the plasma-resistant sintered alumina, therefore, an increased number of YAG crystals having poor mechanical properties come into contact with each other. This results in insufficient mechanical properties and a low corrosion resistance.

A high-strength sintered alumina according to Patent Document 3 is formed using a YAG powder that contains previously synthesized alumina and yttria. Thus, the raw material cost is high. Furthermore, in this high-strength sintered alumina, $\alpha\text{-}Al_2O_3$ at the surface of the sintered alumina has a peak of maximum intensity at a (104) plane as in conventional $\alpha\text{-}Al_2O_3$. The sintered alumina has such a crystal structure that $I_{116}/I_{104}$ is 0.8 or less, wherein $I_{116}$ and $I_{104}$ denote peaks assigned to a (116) plane and the (104) plane, respectively. The high-strength sintered alumina therefore cannot sufficiently meet the demands of high strength and high corrosion resistance.

In a high-strength and high-hardness alumina ceramic according to Patent Document 4, during a firing process, most Al—Y hydroxide is converted into YAG particles or YAG particles entirely surrounded by alumina. It is believed that YAG particles not surrounded by alumina grow by sintering before the growth of alumina particles and the YAG particles entirely surrounded by alumina. Consequently, YAG crystals are likely to segregate by abnormal grain growth or agglomeration, or to be surrounded by alumina crystal grains. Thus, the peak intensity of $Al_2O_3$ at the surface of a sintered body in X-ray diffraction appears at a (104) plane, and the percentage of YAG crystals in contact with alumina crystals may decrease below 70%. In particular, when Al—Y hydroxide is of fine particles, YAG particles have a tendency to grow into grains by sintering before the growth of alumina crystals by sintering. Thus, YAG crystals particularly have a tendency to agglomerate, and the percentage of YAG crystals in contact with alumina crystals may decrease below 70%. Furthermore, when YAG crystals are present within an alumina crystal grain, the sintered body has low thermal conductivity. Thermal stress, such as thermal shock, may therefore cause a crack or a fracture in the sintered body. Furthermore, because YAG particles have a tendency to become spherical by agglomeration, the YAG crystal grains easily fall off the surface of the alumina ceramic as corrosion proceeds. This may also cause a fracture.

In the sintered bodies according to Patent Documents 1 to 4, YAG crystals, which have a corrosion resistance higher than that of alumina crystals, are likely to agglomerate. Hence, the sintered bodies cannot have a sufficient corrosion resistance and mechanical properties in a plasma of a corrosive gas containing a halogen element. The term agglomeration, as used herein, means that many YAG crystals come into contact with each other.

The agglomeration of YAG crystals, which have a lower fracture toughness than alumina crystals, may result in the development of a microcrack from an agglomerated YAG crystal, when a mechanical stress is applied to a sintered body. Consequently, a sintered body containing agglomerated YAG crystals has a low fracture toughness and poor mechanical properties.

In particular, the ceramic composite according to Patent Document 1 contains acicular or rod-like alumina crystals having a length of several tens of micrometers or more in the longitudinal direction. Thus, when the ceramic composite is used as a corrosion-resistant member, the alumina crystals are severely corroded.

In the sintered bodies according to Patent Documents 3 and 4, the peak intensity of $Al_2O_3$ at a surface of a sintered body in X-ray diffraction appears at the (104) plane, and $I_{116}/I_{104}$ is 0.8 or less, wherein $I_{116}$ and $I_{104}$ denote peaks assigned to the (116) plane and the (104) plane, respectively.

Means for Solving the Problems

According to a first aspect of the invention, a corrosion-resistant member comprises a sintered body. The sintered body contains $\alpha\text{-}Al_2O_3$ crystals and YAG crystals. The content of Al in the sintered body is in the range of 70% to 98% by mass in terms of $Al_2O_3$. The content of Y in the sintered body is in the range of 2% to 30% by mass in terms of $Y_2O_3$. The peak intensity ratio $I_{116}/I_{104}$ is in the range of 0.94 to 1.98, where $I_{116}$ and $I_{104}$ denote peak intensities assigned to a (116) plane and a (104) plane, respectively, of $\alpha\text{-}Al_2O_3$ crystals in a surface layer of the sintered body in X-ray diffraction.

According to a second aspect of the invention, a treatment apparatus, in which a sample placed in a treatment container is subjected to etching or deposition with a corrosive gas or its plasma, comprises the corrosion-resistant member. The corrosion-resistant member comprises a sintered body that contains $\alpha\text{-}Al_2O_3$ crystals and YAG (yttrium aluminum garnet) crystals. The content of Al in the sintered body is in the range of 70% to 98% by mass in terms of $Al_2O_3$. The content of Y in the sintered body is in the range of 2% to 30% by mass in terms of $Y_2O_3$. The peak intensity ratio $I_{116}/I_{104}$ is in the range of 0.94 to 1.98, where $I_{116}$ and $I_{104}$ denote peak intensities assigned to a (116) plane and a (104) plane, respectively, of $\alpha\text{-}Al_2O_3$ crystals in a surface layer of the sintered body in X-ray diffraction.

According to the present invention, at least a part of the treatment container may contain the corrosion-resistant member.

According to a third aspect of the invention, a sample treatment method using the treatment apparatus, comprising steps of placing a sample in the treatment container, subjecting the sample to etching or deposition with a corrosive gas or its plasma, and removing the sample from the treatment container.

The preferable peak intensity ratio $I_{116}/I_{104}$ of the sintered body may be 1.21 or more.

Average grain size of the YAG crystals, for example, is in the range of 10% to 80% of that of $\alpha$-$Al_2O_3$ crystals. Preferably, the average grain size of $\alpha$-$Al_2O_3$ crystals may be in the range of 1 μm to 10 μm and the average grain size of YAG crystals may be in the range of 0.5 μm to 8 μm.

The sintered body may contain Al, Y, Mg, and O elements at grain boundaries. In addition, the mass percentage of Y element at the grain boundaries may be preferably in the range of 0.1% to 30% by mass of the total mass of Al, Y, Mg, and O elements. A Mg element may be present as $MgAl_2O_4$ at grain boundaries.

YAG crystals may have a wedge shape. The occupied area percentage of YAG crystals at a surface of the sintered body may be at least 2%. At least 70% of YAG crystals may be preferably in contact with alumina crystals.

The percentage of open pores in the surface of the sintered body may be 2% or less.

According to a fourth aspect of the invention, a method for manufacturing a corrosion-resistant member, which comprises a sintered body that contains $\alpha$-$Al_2O_3$ crystals and YAG (yttrium aluminum garnet) crystals, comprises the steps of forming a powder compact of a mixed powder that contains an $\alpha$-$Al_2O_3$ powder having an average particle size in the range of 0.1 μm to 1.5 μm and an $Y_2O_3$ powder having an average particle size of 5 μm or less, and firing the powder compact.

The firing may be carried out, for example, at a pressure of 1.2 atm or more. A preferable holding temperature during firing may be in the range of 1500° C. to 1700° C., and a preferable rate of cooling from the holding temperature to 1000° C. may be 100° C./h or less.

Advantages

In a corrosion-resistant member according to the present invention, the ratio of a peak intensity assigned to a (116) plane to a peak intensity assigned to a (104) plane of $\alpha$-$Al_2O_3$ in a surface layer (portion to be exposed to a corrosive gas containing a halogen element) in X-ray diffraction is in the range of 0.94 to 1.98. In other words, a higher proportion of $\alpha$-$Al_2O_3$ crystals are orientated to the (116) plane than to the (104) plane, to which a peak intensity of a conventional sintered alumina assigned. Thus, a corrosion-resistant member according to the present invention has excellent mechanical properties and a high corrosion resistance, has a high corrosion resistance to a corrosive halogen gas or its plasma, and can be used for a long period of time.

A treatment apparatus according to the present invention includes a corrosion-resistant member that has excellent mechanical properties and a high corrosion resistance. The treatment apparatus can therefore be used for a long period of time in an atmosphere of a corrosive gas containing a halogen element or its plasma. In addition, because the treatment apparatus also has excellent mechanical properties, its components do not need frequent replacing. In a sample treatment method using the treatment apparatus, when a sample is subjected to etching or deposition with a corrosive gas or its plasma, use of the corrosion-resistant member described above can reduce the occurrence of particles because of its high corrosion resistance.

According to a manufacturing method of the present invention, a corrosion-resistant member is produced from a relatively small $\alpha$-$Al_2O_3$ powder having an average particle size in the range of 0.1 to 1.5 μm. Thus, YAG crystals can appropriately be dispersed in the corrosion-resistant member. A corrosion-resistant member having excellent mechanical F properties and a high corrosion resistance can therefore be produced by the manufacturing method according to the present invention.

Figure 1:
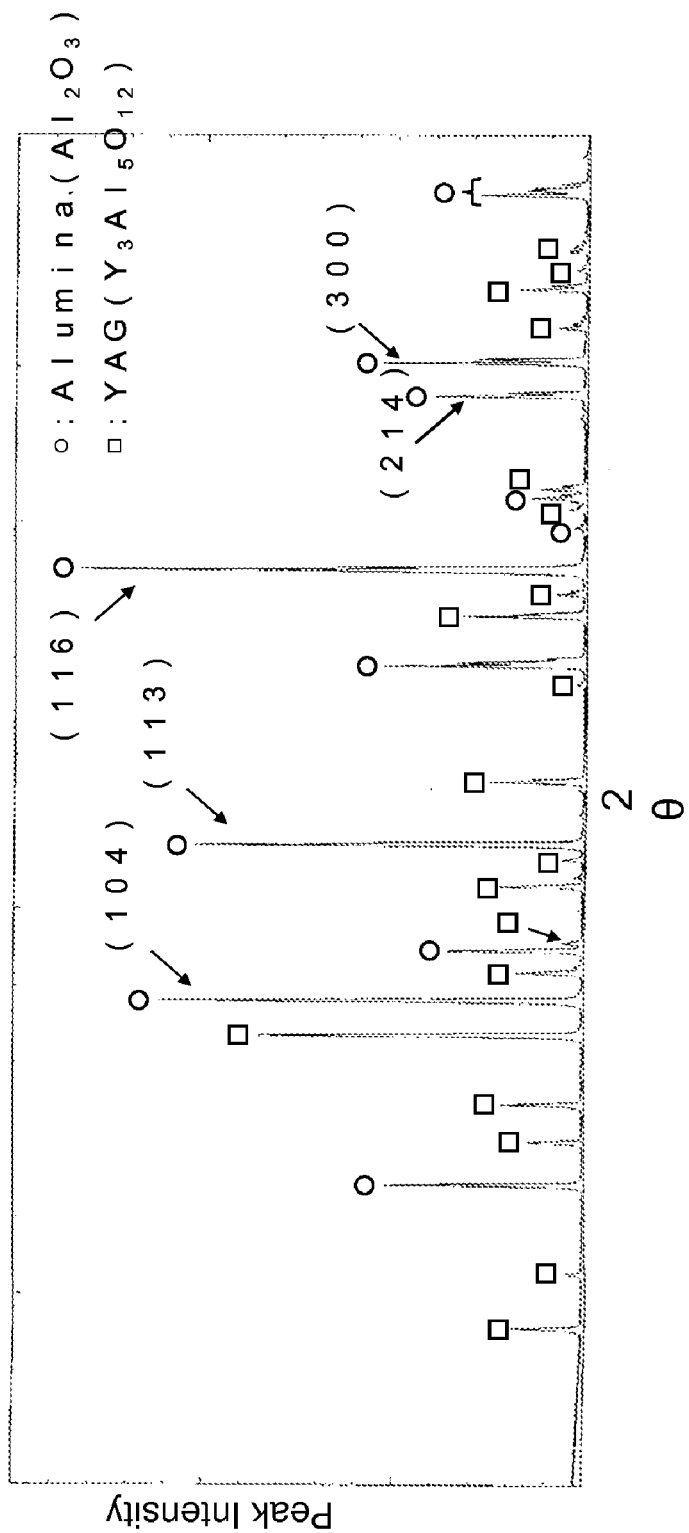
FIG. 1 is an X-ray diffraction chart of a surface layer of a corrosion-resistant member according to an embodiment of the present invention.

REFERENCE NUMERALS 1 corrosion-resistant member
2 $\alpha$-$Al_2O_3$ crystals
3 YAG crystals
4 inductively coupled plasma etching apparatus (treatment apparatus)
40 lower chamber (part of treatment container)
41 lid (part of treatment container)

BEST MODES FOR CARRYING OUT THE INVENTION

The best modes for carrying out the present invention is described in detail below.

A corrosion-resistant member according to the present invention is formed of a sintered body that contains $\alpha$-$Al_2O_3$ crystals and YAG (yttrium aluminum garnet) crystals. The corrosion-resistant member contains, as metallic elements, 70% to 98% by mass of Al in terms of $Al_2O_3$ and 2% to 30% by mass of Y in terms of $Y_2O_3$ The following is the reason that the sintered body contains 70% to 98% by mass of Al in terms of $Al_2O_3$ and 2% to 30% by mass of Y in terms of $Y_2O_3$. When the sintered body contains at least 70% by mass of $Al_2O_3$ (the Y content is 30% by mass or less in terms of $Y_2O_3$), the corrosion-resistant member can have satisfactory mechanical properties. In other words, when the sintered body contains less than 70% by mass of Al in terms of $Al_2O_3$ (the Y content is more than 30% by mass in terms of $Y_2O_3$), the content of $\alpha$-$Al_2O_3$ crystals, which have excellent mechanical properties, is decreased. This results in poor mechanical properties of the sintered body. On the other hand, when the sintered body contains more than 98% by mass of Al in terms of $Al_2O_3$ (the Y content is less than 2% by mass in terms of $Y_2O_3$), the content of YAG crystals in the sintered body is decreased. This results in a low corrosion resistance.

A corrosion-resistant member according to the present invention contains inevitable impurities, such as Si, Ca, Fe, Cr, and Na. Preferably, the content of these inevitable impurities in the corrosion-resistant member is 5000 mass ppm or less to the total mass of $Al_2O_3$ and YAG. When the content of the inevitable impurities is 5000 mass ppm or less, adverse effects due to the inevitable impurities, such as the generation of particles, can be reduced in corrosion-resistant members that require a reduction in sample contamination with impurities, for example, a shower plate, a clamping ring, and a focus ring. The inevitable impurities can be analyzed by X-ray fluorescence analysis or inductively coupled plasma (ICP) emission spectrometry.

In a corrosion-resistant member according to the present invention, the peak intensity ratio $I_{116}/I_{104}$ is in the range of 0.94 to 1.98, wherein 116 and 1104 denote peak intensities assigned to a (116) plane and a (104) plane, respectively, of $\alpha$-$Al_2O_3$ in a surface layer of the member in X-ray diffraction. In other words, a higher proportion of $\alpha$-$Al_2O_3$ crystals are orientated to the (116) plane than to the (104) plane, to which a peak intensity of a conventional sintered $\alpha$-$Al_2O_3$ assigned. A corrosion-resistant member having such a peak intensity ratio $I_{116}/I_{104}$ can be formed by forming a powder compact from a fine $\alpha$-$Al_2O_3$ powder (for example, a powder having an average particle size in the range of 0.1 μm to 1.5 μm) and an yttria powder as a YAG source and firing the powder compact. Further details will be described below.

Since X-ray diffraction is performed on a mirror-finished surface of a corrosion-resistant member (sintered body), the $I_{116}/I_{104}$ is determined for the polished surface. Thus, the term "surface layer" of a corrosion-resistant member (sintered body) includes a region containing a portion that becomes a polished surface, for example, a portion having a depth of at least 10 μm from a surface of the corrosion-resistant member (sintered body). The term "surface layer" refers to a portion containing any surface of a corrosion-resistant member and, in particular, advantageously includes a portion containing a corrosion-resistant surface to be exposed to a corrosive gas containing a halogen element or a plasma of a corrosive gas.

A peak of maximum intensity (hereinafter referred to as "first peak") of sintered $\alpha$-$Al_2O_3$ in X-ray diffraction appears on the (104) plane. In the present invention, the crystalline orientation to the (104) plane of a portion formed of $\alpha$-$Al_2O_3$ crystals shifts to the (116) plane. In general, each crystal face of a crystalline oxide has a different atomic arrangement or an interatomic distance, and therefore has different physical and chemical properties. As is clear from examples described below, in a sintered body that contains $\alpha$-$Al_2O_3$ crystals and YAG crystals as the main crystals, when the peak intensity ratio $I_{116}/I_{104}$ is less than 0.94, the sintered body only has mechanical properties similar to those of conventional sintered bodies. On the other hand, when the peak intensity ratio $I_{116}/I_{104}$ is more than 1.98, the crystalline orientation to the (116) plane becomes excessive. This unpreferably results in poor mechanical properties. Thus, when the peak intensity ratio $I_{116}/I_{104}$ is in the range of 0.94 to 1.98, a corrosion-resistant member according to the present invention has mechanical properties superior to those of conventional sintered bodies that contain $\alpha$-$Al_2O_3$ crystals and YAG crystals as the main crystals. A portion formed of $\alpha$-$Al_2O_3$ crystals in a corrosion-resistant member according to the present invention has a crystalline orientation different from those of conventional $\alpha$-$Al_2O_3$ crystals. Thus, it is believed that the crystalline oxide has an atomic arrangement or an interatomic distance that imparts excellent mechanical properties.

The peak intensity ratio $I_{116}/I_{104}$ is preferably at least 1.00 and is more preferably at least 1.21. Such a peak intensity ratio results in not only excellent mechanical properties, but also the production of a more densely sintered body and an improvement in corrosion resistance.

FIG. 1 is an X-ray diffraction chart of a corrosion-resistant member according to the present invention. The X-ray diffraction chart was obtained by measuring a certain point on a surface of the member with an X-ray diffractometer (irradiation area: 2 cm×2 cm). In the X-ray diffraction chart, the vertical axis represents the peak intensity, and the horizontal axis represents the diffraction angle (2θ). Each peak is marked with an open circle or an open square. Peaks marked with an open circle belong to $\alpha$-$Al_2O_3$. Peaks marked with an open square belong to YAG. Furthermore, peaks assigned to (104), (113), (116), (214), and (300) planes, which are main peaks of $\alpha$-$Al_2O_3$, are indicated by an arrow.

As described in the Joint Committee of Powder Diffraction Standards (JCPDS) card, in the X-ray diffraction chart of sintered $\alpha$-$Al_2O_3$ (corundum), the first peak appears on the (104) plane. Other peaks have a peak intensity equal to 89% or less of that of the first peak (the second peak of the (116) plane has a peak intensity equal to 89% of that of the (104) plane).

In contrast, as shown in FIG. 1, $\alpha$-$Al_2O_3$ in a corrosion-resistant member according to the present invention has the first peak of the (116) plane, and is different from sintered bodies having the first peak of the (104) plane, such as conventional sintered $\alpha$-$Al_2O_3$ and sintered $\alpha$-$Al_2O_3$—YAG. This may be because, in a corrosion-resistant member according to the present invention, materials for forming a powder compact are a fine $\alpha$-$Al_2O_3$ powder (for example, a powder having an average particle size in the range of 0.1 μm to 1.5 μm) and an $Y_2O_3$ powder as a YAG source. More specifically, use of the fine $\alpha$-$Al_2O_3$ powder having a size smaller than that of conventional $\alpha$-$Al_2O_3$ powders results in an $\alpha$-$Al_2O_3$ crystal form different from those of conventional $\alpha$-$Al_2O_3$ crystals. Furthermore, use of an $Y_2O_3$ precursor as a YAG source, as in the conventional manner, allows YAG crystals to be appropriately adjacent to $\alpha$-$Al_2O_3$ crystals. Probably because of these reasons, the first peak appears on the (116) plane.

While FIG. 1 shows an X-ray diffraction chart obtained by measuring an X-ray irradiation area of 2 cm×2 cm with an X-ray diffractometer, the peak intensity may be a mean value of two to ten measuring points. The spot diameter may be at least 10 μm. Furthermore, whether a given member is a corrosion-resistant member according to the present invention or not can be determined by assigning each peak of an X-ray diffraction chart to its corresponding substance according to the JCPDS card, and analyzing each peak intensity and the relationship thereof. As for the JCPDS card "No.", for example, refer to No. 46-1212 for the X-ray diffraction pattern of $\alpha$-$Al_2O_3$ crystals, and No. 33-40 for that of YAG crystals.

Figure 2:
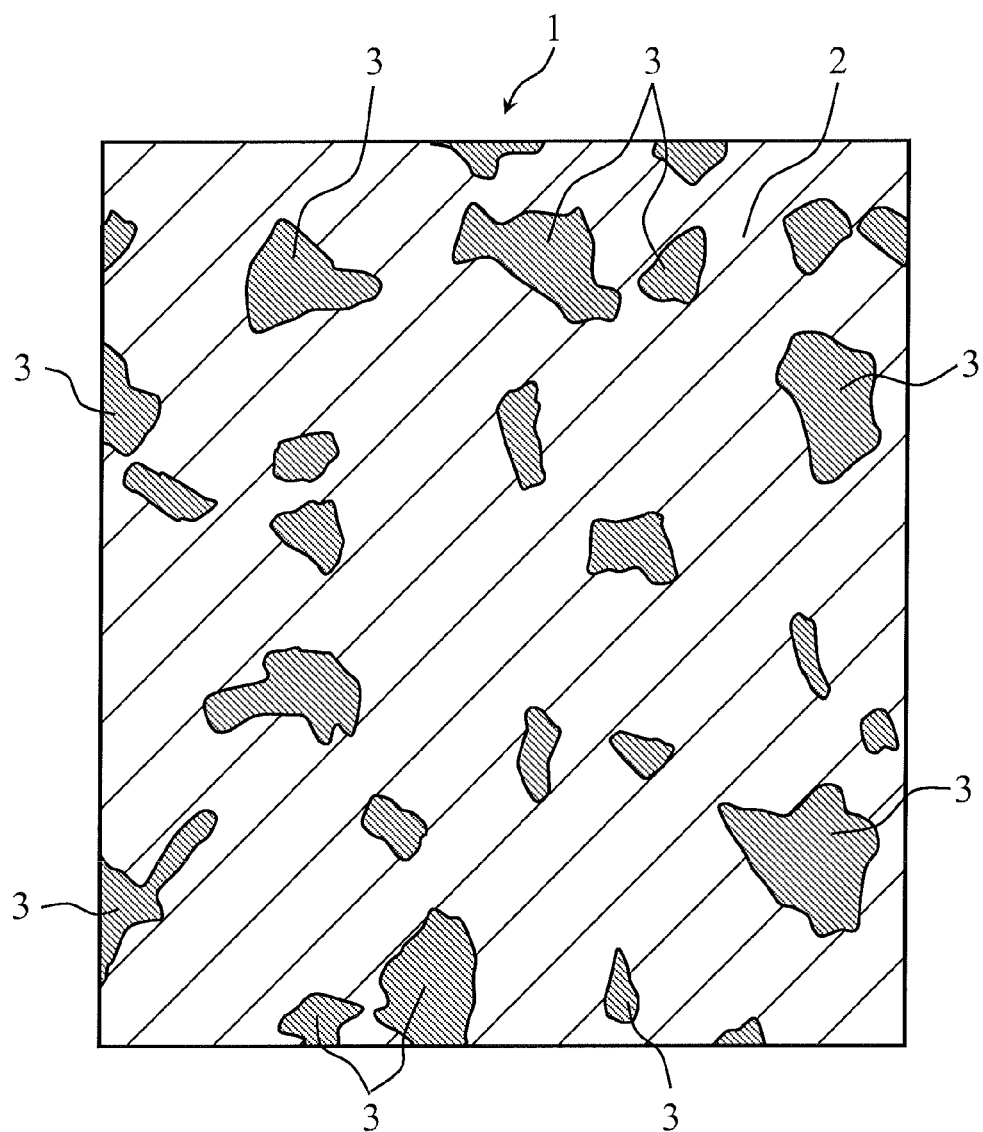
FIG. 2 is a trace drawing of cross-sectional SEM photographs of a corrosion-resistant member according to an embodiment of the present invention.
Figure 3:
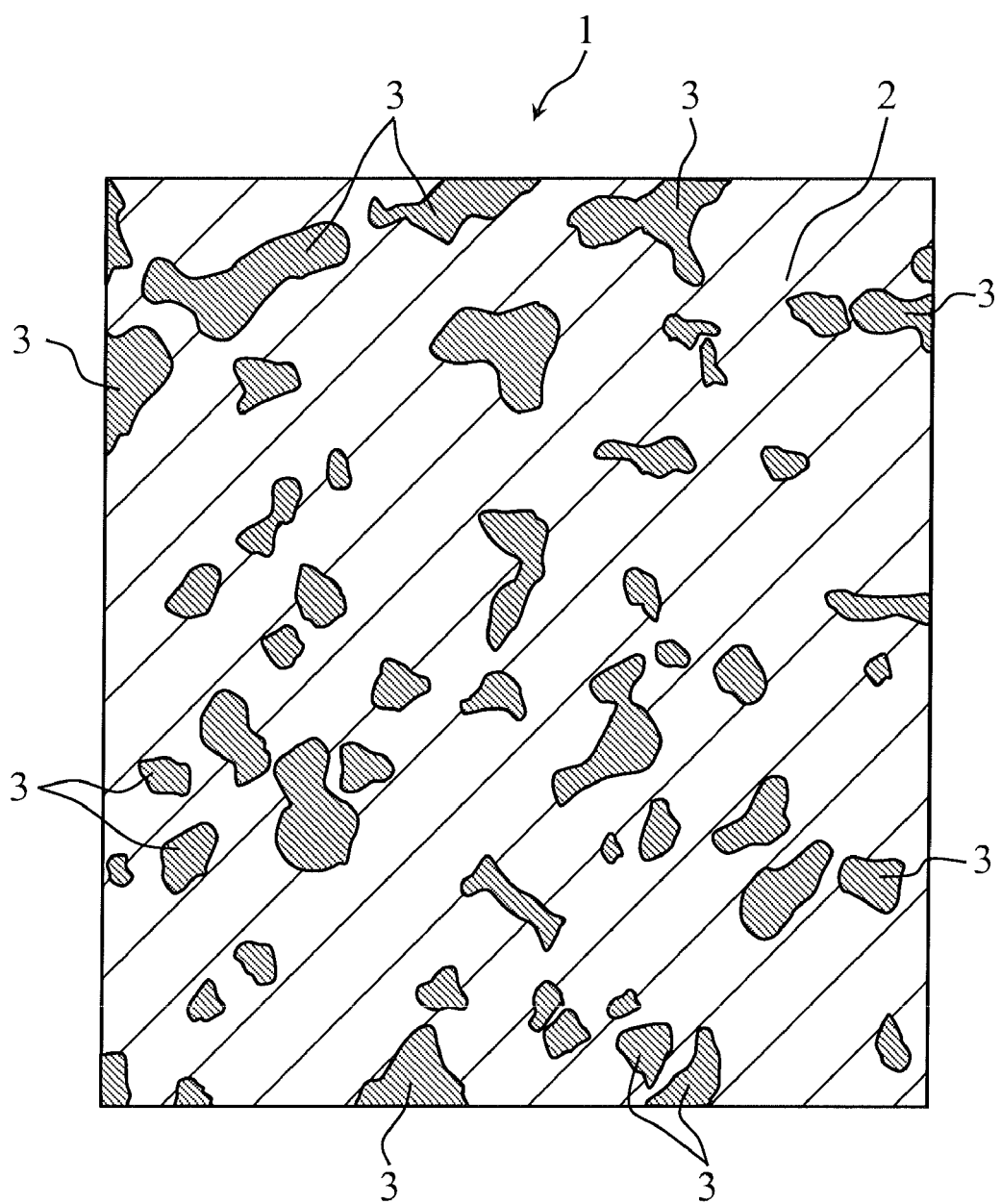
FIG. 3 is another trace drawing of cross-sectional SEM photographs of another corrosion-resistant member according to an embodiment of the present invention.

FIGS. 2 and 3 show trace drawings of cross-sectional SEM photographs of a corrosion-resistant member according to an embodiment of the present invention. The magnification of the SEM photographs is 2000. Reference numeral 1 denotes a corrosion-resistant member, reference numeral 2 denotes $\alpha$-$Al_2O_3$ crystals, and reference numeral 3 denotes YAG crystals. Furthermore, FIG. 2 corresponds to the peak intensity ratio $I_{116}/I_{104}$ of 0.94. FIG. 3 corresponds to the peak intensity ratio $I_{116}/I_{104}$ of 1.98. In FIGS. 2 and 3, the outlines of α-$Al_2O_3$ crystals are omitted.

As shown in FIGS. 2 and 3, the YAG crystals 3 are appropriately dispersed in the α-$Al_2O_3$ crystals, and the dispersibility of the YAG crystals 3 is good in both cases.

In FIG. 2 (the peak intensity ratio $I_{116}/I_{104}$ is 0.94), the YAG crystals 3 have relatively large areas. In FIG. 3 (the peak intensity ratio $I_{116}/I_{104}$ is 1.98), the YAG crystals 3 have relatively small areas. The YAG crystals 3 are formed by the reaction between α-$Al_2O_3$ and $Y_2O_3$ during a sintering process. A finer α-$Al_2O_3$ raw material may result in smaller YAG crystals 3. FIG. 3 (the peak intensity ratio $I_{116}/I_{104}$ is 1.98) more obviously reflects the effect of a finer α-$Al_2O_3$ raw material, and a higher proportion of crystals are orientated to the (116) plane. This increases the peak intensity ratio $I_{116}/I_{104}$, thus providing a structure having better mechanical properties.

In a corrosion-resistant member 1 according to the present invention, the peak intensity ratio $I_{300}/I_{214}$ is preferably in the range of 1.1 to 2.0, wherein $I_{214}$ and $I_{300}$ denote peak intensities assigned to a (214) plane and a (300) plane, respectively, of α-$Al_2O_3$ crystals in X-ray diffraction. In a sintered α-$Al_2O_3$, the peak intensity $I_{214}$ is higher than the peak intensity $I_{300}$. In contrast, as shown in FIG. 1, the corrosion-resistant member 1 according to the present invention has a crystal structure in which crystals are oriented such that the peak intensity $I_{300}$ is higher than the peak intensity $I_{214}$. Thus, the corrosion-resistant member 1 has improved mechanical properties.

In a corrosion-resistant member 1 according to the present invention, the average grain size of YAG crystals is preferably in the range of 10% to 80% of that of α-$Al_2O_3$ crystals. This allows the YAG crystals to be appropriately dispersed in the corrosion-resistant member 1, thus ensuring a high corrosion resistance and excellent mechanical properties. When the average grain size of YAG crystals is less than 10% of the average grain size of α-$Al_2O_3$ crystals, the YAG crystals are poorly dispersed, and the corrosion resistance deteriorates. On the other hand, when the average grain size of YAG crystals is more than 80% of the average grain size of α-$Al_2O_3$ crystals, the YAG crystals become large. Thus, under a fracture stress, the high-strength α-$Al_2O_3$ crystals rarely prevent the development of a crack. Thus, the mechanical properties, particularly the fracture toughness, deteriorate.

In a corrosion-resistant member 1 according to the present invention, the average grain size of α-$Al_2O_3$ crystals is preferably in the range of 1 µm to 10 µm, and the average grain size of YAG crystals is preferably in the range of 0.5 µm to 8 µm. This allows the corrosion-resistant member 1 to have a high corrosion resistance and excellent mechanical properties. When the average grain size of α-$Al_2O_3$ crystals is less than 1 µm, a portion only formed of α-$Al_2O_3$ crystals has a very low fracture toughness. Thus, the corrosion-resistant member 1 is likely to have chipping during use. On the other hand, the average grain size of α-$Al_2O_3$ crystals is more than 10 µm, the mechanical properties, such as the bending strength, deteriorate largely. When the average grain size of YAG crystals is less than 0.5 µm, if α-$Al_2O_3$ crystals, which have an inferior corrosion resistance, are corroded by a corrosive gas earlier than the YAG crystals, the YAG crystals are likely to fall off and may become particles. On the other hand, when the average grain size of YAG crystals is more than 8 µm, the application of a fracture stress to the corrosion-resistant member increases the size of the YAG crystals, which have an inferior strength. Thus, a crack propagates easily, and therefore the fracture toughness of the corrosion-resistant member deteriorates.

In addition to the average grain size of α-$Al_2O_3$ crystals in the range of 1 µm to 10 µm, and the average grain size of YAG crystals in the range of 0.5 µm to 8 µm, the average grain size of YAG crystals may be in the range of 10% to 80% of the average grain size of α-$Al_2O_3$ crystals. When these conditions are satisfied, the corrosion-resistant member 1 can have a finer and denser structure, as well as an improved corrosion resistance and mechanical properties.

A corrosion-resistant member 1 according to the present invention may contain Al, Y, Mg, and O elements at grain boundaries. The mass percentage of Y element at the grain boundaries is preferably in the range of 0.1% to 30% by mass of the total mass of Al, Y, Mg, and O elements.

When a corrosion-resistant member is used as a component of a treatment apparatus for use in the production of a semiconductor device or a liquid crystal panel, for example, the corrosion-resistant member exposed to various types of corrosive solutions or gases used in cleaning or used as a plasma source is initially corroded at grain boundaries. Thus, an Y element is preferred because of its highest corrosion resistance to the corrosive solutions or gases among Al, Y, Mg, and O elements, which constitute the grain boundaries. A higher proportion of an Y compound results in a higher corrosion resistance of the grain boundaries. However, when the percentage of Y compound exceeds 30% by mass, while the corrosion resistance of the grain boundaries is improved, the strength of the grain boundaries is decreased. This results in poor mechanical properties, in particular, a low fracture toughness, of the corrosion-resistant member. Hence, the percentage of Y element at the grain boundaries is preferably in the range of 0.1% to 30% by mass.

The percentage of Y element at grain boundaries in a sintered body can be determined as follows: the element count at grain boundaries, in particular, at grain boundaries between α-$Al_2O_3$ particles, on the cross section of the sintered body is determined with an energy dispersive spectrometer, and the percentage of Y element at the grain boundaries is calculated from the resulting element count and the molecular weight of each element. In this case, the percentage of Y element is preferably determined as a mean value of measurements performed at three points or more of a corrosion-resistant member 1. Furthermore, the measurement with the energy dispersive spectrometer is performed after measuring points are checked, for example, with a transmission electron microscope (hereinafter referred to as "TEM") under high magnification. The measurement is performed at a spot diameter of electron beam irradiation in the range of 0.5 to 5 nm and an energy width in the range of 0.1 to 50 keV for a time period in the range of 30 to 75 seconds. Furthermore, the quantitative calculation is performed, for example, by thin-film approximation method.

Al, Y, Mg, and O elements are present as compounds, such as $YAlO_3$ (YAP), $Y_4Al_2O_9$ (YAM), and $MgAl_2O_4$, at grain boundaries. Al, Y, Mg, and O elements may be present, at grain boundaries, as other compounds produced by a reaction thereof. Furthermore, when a Mg element is present as $MgAl_2O_4$ at grain boundaries, $MgAl_2O_4$ crystals can block the crack growth from the grain boundaries. This can reduce the intergranular fracture in a corrosion-resistant member 1, and thereby improve the mechanical properties.

The Mg content in a corrosion-resistant member 1 is preferably in the range of 0.05% to 1% by mass in terms of MgO. Because of this, a corrosion-resistant member 1 can have a high strength, a high density, no crack, and an appropriately controlled fracture toughness. When the Mg content is less than 0.05% by mass, $\alpha$-$Al_2O_3$ particles or YAG particles may grow excessively under certain firing conditions. This unpreferably increases pores or causes a crack. On the other hand, when the Mg content is more than 1% by mass in terms of MgO, a large number of $MgAl_2O_4$ crystals may be produced by the reaction between Mg and $Al_2O_3$. This may reduce the strength and the fracture toughness.

Preferably, YAG crystals in contact with $\alpha$-$Al_2O_3$ crystals at least at a surface of a corrosion-resistant member 1 according to the present invention have a wedge shape. Because of this, even when the corrosion-resistant member 1 is exposed to a corrosive halogen gas, the YAG crystals function as anchors for $\alpha$-$Al_2O_3$ crystals, as compared with spherical or substantially spherical YAG crystals. Thus, YAG crystals rarely fall off, and the corrosion-resistant member 1 can have a higher corrosion resistance.

Figure 4:
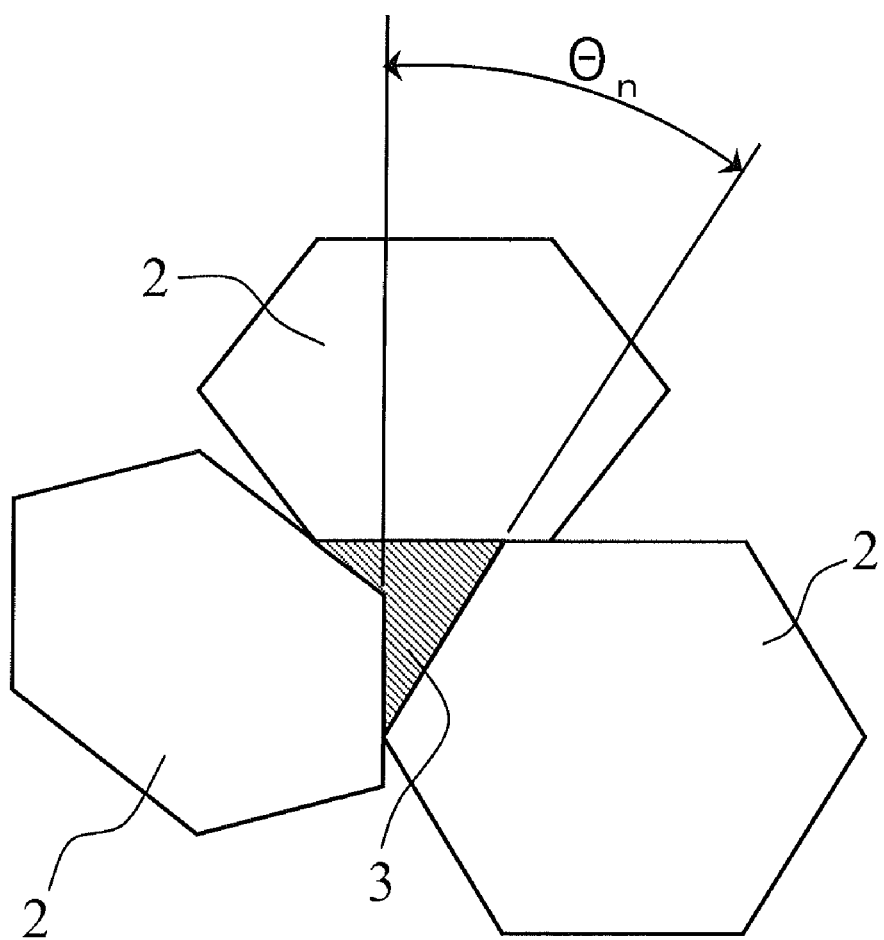
FIG. 4 is a schematic view illustrating a method for measuring the crossed axes angle of a wedge-shaped YAG crystal in a corrosion-resistant member according to an embodiment of the present invention.

The term "wedge-shaped crystal", as used herein, refers to a crystal in which at least one crossed axes angle $\theta n$ (n=1, 2, etc.) formed by lines showing the outer edges of a YAG crystal 3 is less than 90°, as illustrated in FIG. 4, when the surface of a member is observed with a scanning electron microscope (hereinafter referred to as "SEM"). In particular, the crossed axes angle $\theta n$ of 60° or less can further prevent the YAG crystal 3 from falling off, thus providing an improved corrosion-resistant member 1.

Preferably, in the wedge-shaped crystal, a minimum crossed axes angle $\theta n$ is disposed in a direction perpendicular to a surface that is exposed to a corrosive gas containing a halogen element or its plasma, because this achieves the highest anchoring effect.

The average grain size of wedge-shaped YAG crystals can be determined, for example, by a coding method with an SEM photograph with a magnification in the range of 20 to 3000, or by numerical analysis of an image observed with an SEM at a magnification in the range of 20 to 3000. More specifically, in the coding method, at least 10, preferably at least 20, particle sizes are measured by counting the number of grain boundaries that cross a straight line having a predetermined length in several SEM photographs, and a mean value is calculated from the measurements.

Preferably, the occupied area percentage of YAG crystals at least at a surface of a corrosion-resistant member 1 according to the present invention is at least 2%. Because of this, the YAG crystals are uniformly dispersed without agglomerates at the surface of the corrosion-resistant member 1. Thus, the corrosion resistance can be maintained for a long period of time. More preferably, the occupied area percentage of the YAG crystals is 50% or less to prevent deterioration in mechanical properties.

The occupied area percentage of YAG crystals at the surface can be determined from an SEM photograph with a magnification in the range of 20 to 5000.

Preferably, a corrosion-resistant member 1 according to the present invention contains two pores or less having a maximum size of more than 10 µm at a grain boundary triple junction (a region in which three grain boundaries meet) disposed in a 10 µm×10 µm area at the surface of the member 1. More preferably, a corrosion-resistant member 1 according to the present invention contains one pore or less having a maximum size of more than 5 µm at a grain boundary triple junction disposed in a 10 µm×10 µm area. The number of pores having a maximum size of more than 10 µm at a grain boundary triple junction affects the corrosion resistance of the corrosion-resistant member 1. Pores having a maximum size of even more than 5 µm may affect the corrosion resistance of the corrosion-resistant member 1. As described above, the corrosion-resistant member 1 is initially corroded at grain boundaries when exposed to a corrosive solution or gas. Thus, a large number of pores at a grain boundary triple junction may accelerate the corrosion of the corrosion-resistant member 1. Since grain boundary triple junctions are almost uniformly distributed over the entire surface, observation of any 10 µm×10 µm area can give information on the entire surface. Thus, when the number of pores having a maximum size of more than 10 µm disposed at a grain boundary triple junction in any 10 µm×10 µm area is as small as two or less, or, preferably, when the number of pores having a maximum size of more than 5 µm disposed at the grain boundary triple junction is one or less, corrosion at the grain boundaries can be reduced, and the corrosion-resistant member 1 can have an improved corrosion resistance. As a result, the corrosion-resistant member 1 can suitably be used as a component for applications that require a higher corrosion resistance, for example, shower plates, clamping rings, and focus rings.

Furthermore, in a corrosion-resistant member 1 according to the present invention, the number of YAG crystal grains in a 20 µm×20 µm area at least at the surface of the member 1 is 80 or less. Because of this, the corrosion-resistant member 1 has a high strength and a high hardness while retaining a corrosion resistance to a corrosive gas. Preferably, the number of YAG crystal grains is at least 12, in view of the corrosion resistance. More preferably, the number of YAG crystal grains is 36 or less, in view of a high strength and a high hardness.

The number of YAG crystal grains can be determined by numerical analysis of an SEM photograph with a magnification in the range of 20 to 5000, or of an image observed with an SEM at a magnification in the range of 20 to 5000.

Figure 5:
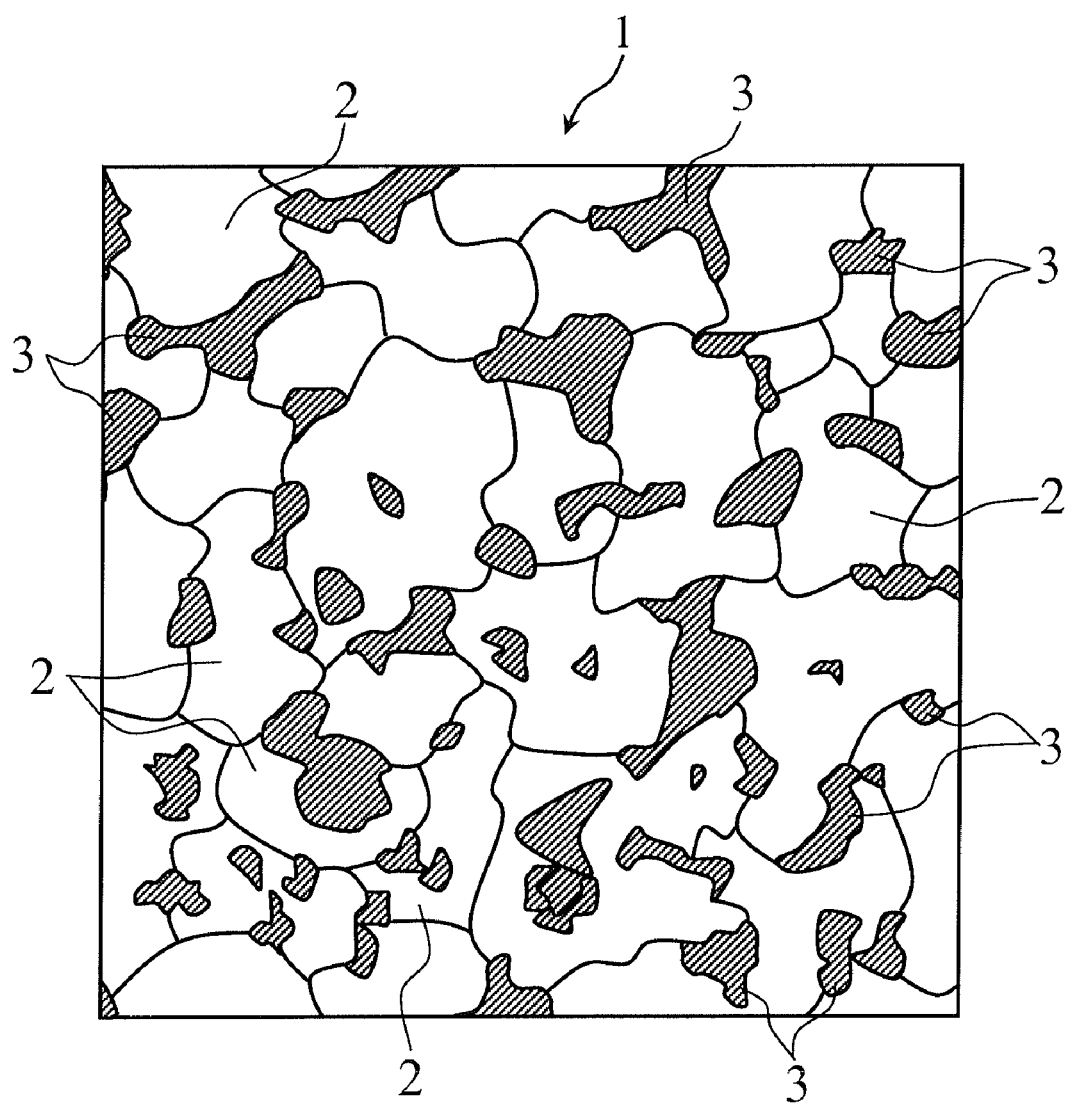
FIG. 5 is another trace drawing of cross-sectional SEM photographs of another corrosion-resistant member according to an embodiment of an embodiment of the present invention.

FIG. 5 is a trace drawing of a cross-sectional SEM photograph of a corrosion-resistant member 1 according to an embodiment of the present invention. FIG. 5 schematically shows the positions of $\alpha$-$Al_2O_3$ crystals 2 and YAG crystals 3 on an enlarged flat surface prepared by processing a cross section of a sintered body. As shown in FIG. 5, the corrosion-resistant member 1 contains the $\alpha$-$Al_2O_3$ crystals 2 and the YAG crystals 3 as the main crystals.

Preferably, in a corrosion-resistant member 1 according to the present invention, at least 70% of YAG crystals 3 at a surface of the member 1 are in contact with $\alpha$-$Al_2O_3$ crystals. This prevents the YAG crystals 3 from agglomerating or segregating. Consequently, in the corrosion-resistant member 1, the YAG crystals 3 are dispersed well and packaged densely. Thus, the corrosion-resistant member 1 has a higher corrosion resistance to a corrosive atmosphere than sintered $\alpha$-$Al_2O_3$.

When the corrosion-resistant member 1 is exposed to a corrosive gas for a long period of time, $\alpha$-$Al_2O_3$ crystals 2, which have a low corrosion resistance, may be etched by corrosion more deeply than YAG crystals 3. Thus, YAG crystals 3 may protrude from the surface of the corrosion-resistant member 1. When $\alpha$-$Al_2O_3$ crystals 2 are further corroded to expose the YAG crystals 3 entirely at the surface of the corrosion-resistant member 1, the YAG crystals 3 may form large particles and fall off. On the other hand, when YAG crystals 3 are in contact with at least 70% of $\alpha$-$Al_2O_3$ crystals 2, if $\alpha$-$Al_2O_3$ crystals 2 are corroded more deeply than YAG crystals 3 to expose the YAG crystals 3 slightly, the proportion of $\alpha$-$Al_2O_3$ crystals 2 in which at least part of the peripheries of the $\alpha$-$Al_2O_3$ crystals 2 are surrounded by the protruding YAG crystals 3, like the walls of a castle, increases. The protruding YAG crystals 3 reduce the speed of a corrosive gas flowing over the surface of the $\alpha$-$Al_2O_3$ crystals 2, thus reducing the corrosion of the $\alpha$-$Al_2O_3$ crystals 2. This prevents the YAG crystals 3 from being entirely exposed, thus preventing the YAG crystals 3 from forming large particles and falling off.

As a result of the prevention of the agglomeration and the segregation of the YAG crystals 3, the corrosion-resistant member 1 according to the present invention can have excellent mechanical properties and form less particles in a corrosive atmosphere, than conventional sintered $\alpha$-$Al_2O_3$—YAG. In other words, an increased number of Al atoms and O (oxygen) atoms contained in $\alpha$-$Al_2O_3$ crystals 2 in contact with YAG crystals 3 near the boundaries between the $\alpha$-$Al_2O_3$ crystals 2 and the YAG crystals 3 also serve as Al atoms and O (oxygen) atoms in the YAG crystals 3. This can reduce the internal stress of the $\alpha$-$Al_2O_3$ crystals 2 caused by mismatching of crystal lattices near the boundaries between the YAG crystals 3 and the $\alpha$-$Al_2O_3$ crystals 2. The reduction in internal stress may result in a reduction in lattice defect of the $\alpha$-$Al_2O_3$ crystals 2, which may lead to excellent mechanical properties and reduce the occurrence of particles.

Because the $\alpha$-$Al_2O_3$ crystals 2 have a fracture toughness higher than that of the YAG crystals 3, when the sintered body is subjected to mechanical stress, a microcrack is likely to be initiated primarily from an edge of a YAG crystal 3, particularly in contact with $\alpha$-$Al_2O_3$ crystals 2. This microcrack grows to cause a crack or a fracture in the sintered $\alpha$-$Al_2O_3$—YAG. As described above, in a corrosion-resistant member 1 according to the present invention, an increased number of Al atoms and O (oxygen) atoms contained in $\alpha$-$Al_2O_3$ crystals 2 near the boundaries between the $\alpha$-$Al_2O_3$ crystals 2 and YAG crystals 3 also serve as Al atoms and O (oxygen) atoms in the YAG crystals 5. Even when a mechanical stress is applied to the corrosion-resistant member 1, therefore, a microcrack rarely occurs at an edge of YAG crystals 3 in contact with $\alpha$-$Al_2O_3$ crystals 2. Thus, the corrosion-resistant member 1 has excellent mechanical properties.

On the other hand, when the sintered body is exposed to a corrosive gas containing a halogen element or a corrosive atmosphere containing a corrosive species (a corrosive gas plasma, high-temperature and high-pressure water vapor, metallic sodium, or the like), the presence of a lattice defect, such as loss or disarrangement of Al or O (oxygen) in the crystal lattice of the $\alpha$-$Al_2O_3$ crystals 2, or loss or disarrangement of Al, Y, or O in the crystal lattice of the YAG crystals 3, makes an atom at the lattice defect or in contact with the lattice defect unstable electrically and crystal-structurally. Thus, the corrosive species has a tendency to selectively etch (that is, removes) an atom of the crystal lattice having the lattice defect. Continual etching of a surface of sintered $\alpha$-$Al_2O_3$—YAG causes particles. However, as described above, the reduction in internal L stress of the $\alpha$-$Al_2O_3$ crystals 2 may result in a reduction in lattice defect, thus making the corrosion-resistant member 1 resistant to etching. In particular, in a corrosion-resistant member 1 according to the present invention, the etching of the $\alpha$-$Al_2O_3$ crystals 2, which can be etched more easily than the YAG crystals 3, is prevented. This can reduce the occurrence of particles.

The proportion of YAG crystals 3 in contact with $\alpha$-$Al_2O_3$ crystals 2 to total YAG crystals 3 depends on the contents of Y and Al, the dispersibility of the $\alpha$-$Al_2O_3$ crystals 2 in the corrosion-resistant member 1, and the grain size distributions of the $\alpha$-$Al_2O_3$ crystals 2 and the YAG crystals 3. When the grain size distributions of the $\alpha$-$Al_2O_3$ crystals 2 and the YAG crystals 3 are further controlled, and the $\alpha$-$Al_2O_3$ crystals 2 are dispersed particularly well in the corrosion-resistant member 1, YAG crystals 3 in contact with $\alpha$-$Al_2O_3$ crystals 2 can be controlled to be at least 70% of the YAG crystals 3, wherein the percentage of Y that is involved in the production of YAG is substantially taken as 100%. Furthermore, even when the corrosion-resistant member 1 is manufactured by impregnating porous alumina particles with a solution containing $Y^{3+}$ ions, heat-treating the alumina particles to produce a raw material containing alumina composite particles impregnated with an Y compound, and molding and firing the raw material, the number of YAG crystals 3 in contact with $\alpha$-$Al_2O_3$ crystals 2 can be controlled to be at least 70%.

To further improve the corrosion resistance and the mechanical properties of the corrosion-resistant member 1, more preferably at least 85% and still more preferably at least 95% of the YAG crystals 3 are in contact with $\alpha$-$Al_2O_3$ crystals 2.

The crystal structures of $\alpha$-$Al_2O_3$ crystals 2 and YAG crystals 3 in a corrosion-resistant member 1 according to the present invention may be identified with an SEM or a TEM or by a micro-X-ray diffraction method, and preferably with a TEM in view of analytical precision.

In the measurement with a TEM, a highly magnified electron diffraction image of each crystal at a surface or a cross section of a corrosion-resistant member 1 is analyzed. The Joint Committee on Powder Diffraction Standards (JCPDS) card is searched for a diffraction pattern that matches the analysis result for identification. The proportion of YAG crystals 3 in contact with $\alpha$-$Al_2O_3$ crystals 2 to the total YAG crystals 3 is determined as described below.

YAG crystals 3 in contact with $\alpha$-$Al_2O_3$ crystals 2 in a corrosion-resistant member 1 according to the present invention are in contact with $\alpha$-$Al_2O_3$ crystals 2 in three dimensions. Thus, it is difficult to three-dimensionally measure the YAG crystals 3. Thus, a sintered surface or a cross section of the corrosion-resistant member 1 is observed to determine the proportion of YAG crystals 3 in contact with $\alpha$-$Al_2O_3$ crystals 2 in two dimensions. This proportion is taken as the proportion of YAG crystals 3 in contact with $\alpha$-$Al_2O_3$ crystals 2 to the YAG crystals 3 contained in a corrosion-resistant member 1 according to the present invention. More specifically, this proportion can be determined as described below. The surface to be measured is either a sintered surface or a cross section. When a cross section is measured, the cross section is previously subjected to mirror-like finishing.

Among reflected electron images, a backscattered electron image of a surface to be measured is taken with an SEM with a magnification in the range of 1000 to 5000. Most crystals in this photograph can be divided broadly into $\alpha$-$Al_2O_3$ crystals 2 and YAG crystals 3. More specifically, the $\alpha$-$Al_2O_3$ crystals 2 have a deeper color than the YAG crystals 3, and the YAG crystals 3 are more whitish than the $\alpha$-$Al_2O_3$ crystals 2. The $\alpha$-$Al_2O_3$ crystals 2 and the YAG crystals 3 can be distinguished from each other by such difference in color tone.

After the $\alpha$-$Al_2O_3$ crystals 2 and the YAG crystals 3 are distinguished from each other, the proportion of YAG crystals 3 in contact with $\alpha$-$Al_2O_3$ crystals 2 to the total YAG crystals 3 may be determined. Because crystals having a grain size of less than 0.1 μm have only limited influence on the corrosion resistance and the mechanical properties, they are eliminated from the determination.

Preferably, the percentage of open pores in the surface of a corrosion-resistant member 1 according to the present invention is 2% or less. This can appropriately prevent edges of the open pores from being corroded by a corrosive halogen gas or its plasma. The surface of the corrosion-resistant member 1 can therefore have an improved corrosion resistance, regardless of the type of corrosive halogen gas or its plasma. The occupied area percentage of a corrosion-resistant member 1 can be determined from an SEM photograph with a magnification in the range of 20 to 5000 or by image analysis with an image analyzing apparatus (LUZEX).

A method for manufacturing a corrosion-resistant member according to the present invention will be described below. A corrosion-resistant member according to the present invention can be manufactured by a number of methods. A representative method will be described below.

First, an α-$Al_2O_3$ powder, an $Y_2O_3$ powder, and, if necessary, an additive, such as a sintering aid, are prepared as starting materials.

Preferably, the primary raw material of α-$Al_2O_3$ has a purity of at least 95% and a BET specific surface area in the range of 1 to 9 $m^2/g$. Furthermore, the primary raw material of α-$Al_2O_3$ has a particle size in the range of 0.1 μm to 1.5 μm. When the primary raw material of α-$Al_2O_3$ has a particle size of less than 0.1 μm, the $Y_2O_3$ powder is poorly dispersed in the α-$Al_2O_3$, YAG crystal grains in a sintered body are also poorly dispersed, the sintered body has poor mechanical properties, and the manufacturing costs increase because of the pulverization of the α-$Al_2O_3$ powder. On the other hand, when the primary raw material of α-$Al_2O_3$ has a particle size of more than 1.5 μm, unlike fine α-$Al_2O_3$, a portion of a corrosion-resistant member formed of α-$Al_2O_3$ crystals is not oriented to a (116) plane in X-ray diffraction, the ratio $I_{116}/I_{104}$ of the peak intensity of the (116) plane to the peak intensity of the (104) plane cannot be in the range of 0.94 to 1.98, and the excellent mechanical properties are difficult to maintain. Thus, when the primary raw material of α-$Al_2O_3$ has a particle size in the range described above, the peak intensity ratio $I_{116}/I_{104}$ at a surface layer of the corrosion-resistant member can be in the range of 0.94 to 1.98.

The $Y_2O_3$ powder preferably has a purity of at least 95% and more preferably at least 99.5%. The primary raw material of the $Y_2O_3$ powder preferably has a particle size 5 μm or less and a BET specific surface area in the range of 2 to 9 $m^2/g$. The primary raw material having a particle size of more than 5 μm is poorly dispersed in the α-$Al_2O_3$ powder. Thus, the primary raw material of the $Y_2O_3$ powder more preferably has almost the same average grain size as the α-$Al_2O_3$ powder.

Furthermore, to control the content of inevitable impurities in a corrosion-resistant member to be 5000 mass ppm or less, the α-$Al_2O_3$ powder and the $Y_2O_3$ powder may have a purity of at least 99.75% so that the purity of a mixed powder of the α-$Al_2O_3$ powder and the $Y_2O_3$ powder is at least 99.5%.

To form wedge-shaped YAG crystal grains in a corrosion-resistant member, the $Y_2O_3$ powder may be elliptical spheres having a BET specific surface area in the range of 2 to 9 $m^2/g$ and an aspect ratio of at least 1.1. The elliptical spheres of the $Y_2O_3$ powder are converted into wedge-shaped YAG particles in a subsequent sintering process. This can prevent the YAG particles from falling off the corrosion-resistant member. However, when the $Y_2O_3$ powder has an aspect ratio of more than 3.0, the YAG crystals have an extremely long wedge shape. When a sintered body is processed in the direction parallel to the major axis of the elongated YAG crystals, the YAG crystals are likely to fall off. Thus, the aspect ratio of more than 3.0 is not preferred. Hence, to form wedge-shaped YAG crystal grains in a corrosion-resistant member, the $Y_2O_3$ powder preferably has an aspect ratio in the range of 1.1 to 3.0.

Second, 70% to 98% by mass of $Al_2O_3$ powder is mixed with 2% to 30% by mass of $Y_2O_3$ powder. The resulting mixture is further mixed with an organic binder. If necessary, a solvent, such as water, is further mixed with the mixture.

Examples of the organic binder include wax emulsion (wax+emulsifying agent), polyvinyl alcohol (PVA), and polyethylene glycol (PEG).

When a corrosion-resistant member contains a Mg compound at grain boundaries, a MgO component is added to the mixture. When a corrosion-resistant member contains 0.05% to 1% by mass of Mg in terms of MgO, the amount of MgO component to be added is 0.05% to 1% by mass of the mixture of the α-$Al_2O_3$ powder and the $Y_2O_3$ powder. Furthermore, when the Mg compound at the grain boundaries is $MgAl_2O_4$, 0.1% to 1% by mass of MgO component is added as a sintering aid.

Examples of the MgO component include magnesium hydroxide, magnesium oxide, magnesium carbonate, and magnesium chloride. Magnesium hydroxide is preferred in view of manufacturing costs.

Third, the mixture is pulverized to form slurry, for example, with a ball mill, a vibrating mill, or a bead mill for 10 to 50 hours. The slurry is dried with a spray drier to form a granulated powder.

To control the occupied area percentage of open pores in the surface of a corrosion-resistant member to be 2% or less, the size of pulverized particles is controlled to be in the range of 0.5 to 1.7 μm. The size of pulverized particles can be determined by a laser scattering diffraction method, for example, with a Microtrac particle size distribution analyzer.

Fourth, the granulated powder is charged into a mold and is pressed to form a powder compact in a predetermined shape. The press forming can be performed by an isostatic pressing method, such as a uniaxial pressing method or a rubber pressing method.

Furthermore, the slurry may be formed into a powder compact by a tape casting method, such as a doctor blade method, or a mold casting method.

The powder compact is, if necessary, dewaxed at a temperature in the range of 300° C. to 600° C. and is then fired, for example, in the air.

For example, the powder compact is fired at a heating rate in the range of 10° C./h to 50° C./h, a holding temperature in the range of 1500° C. to 1700° C., and a rate of cooling from the holding temperature to 1000° C. of 100° C./h or less.

The holding temperature in the range of 1500° C. to 1700° C. is set to produce a dense corrosion-resistant member having excellent mechanical properties, such as the strength, the hardness, and the fracture toughness. In other words, sintering does not proceed sufficiently at a firing temperature of less than 1500° C., and therefore the powder compact cannot be densified. On the other hand, the α-$Al_2O_3$ particles or the YAG particles grow abnormally at a firing temperature of more than 1700° C. This results in deterioration in mechanical properties, such as the strength, the hardness, and the fracture toughness, of the sintered body. More preferably, the firing temperature is in the range of 1630° C. to 1680° C.

The heating rate in the range of 10° C./h to 50° C./h is determined for the following reasons. A heating rate of less than 10° C./h requires sintering for many hours, resulting in high manufacturing costs and excessive crystal growth. On the other hand, a heating rate of more than 50° C./h is too fast for crystals to grow sufficiently, and is likely to cause a crack because of temperature variations during a sintering process. The $Y_2O_3$ powder is fired at such a heating rate to form YAG crystals according to the reaction formula of "$3Y_2O_3 + 5Al_2O_3 \rightarrow 2Y_3Al_5O_{12}$". As described above, the particle sizes of the α-$Al_2O_3$ powder and the $Y_2O_3$ powder can appropriately be controlled so that the $I_{116}/I_{104}$ of α-$Al_2O_3$ crystals at the corrosion-resistant surface in X-ray diffraction is in the range of 0.94 to 1.98.

The rate of cooling from the holding temperature to 1000° C. is set to be 100° C./h or less to crystallize a compound composed of Al, Y, Mg, and O element components at the grain boundaries and to improve the corrosion resistance to a corrosive gas or its plasma.

Furthermore, the internal pressure of a furnace may be higher than the atmospheric pressure during the firing process. Under such a condition, an Y component moves, together with the Al component or other components that have a relatively low melting point and a low viscosity at high temperature, to the grain boundaries and crystallizes to form grain boundaries constituted of a compound mainly composed of Al, Y, Mg, and O elements. Thus, the condition is more preferred. In this case, the internal pressure of H the furnace may be at least 1.2 atm. However, excessively high pressure causes an increase in manufacturing costs. The internal pressure is therefore controlled, for example, to slightly increase the pressure of atmospheric gas in the furnace.

Another method for manufacturing a corrosion-resistant member according to the present invention is described below.

In the method described below, porous $\alpha$-$Al_2O_3$ particles are impregnated with a solution containing $Y^{3+}$ ions, and are heat-treated to produce a raw material powder, which is molded and fired.

The porous $\alpha$-$Al_2O_3$ particles can be produced by heat-treating a precursor, spherical $Al(OH)_3$ particles, in the air and then pulverizing the particles.

The $Al(OH)_3$ spherical particles can be produced by the following method (a method described in Journal of the Ceramic Society of Japan, 112 [7] 409-411 (2004): a method for synthesizing a porous $\alpha$-$Al_2O_3$ particle precursor, spherical $Al(OH)_3$ particles, using an immobilized enzyme in an alginate gel template).

First, an aqueous solution containing ammonium alginate particles and urease is prepared. This aqueous solution and an aqueous solution containing urea ($CO(NH_2)_2$) and aluminum sulfate are mixed to produce an aqueous alginate solution by enzymatic hydrolysis by urea. The aqueous alginate solution contains opaque alginate gel spheres having a diameter of several millimeters produced by the cross-linking of alginate containing $Al^{3+}$ ions. While the alginate gel spheres are left in an aqueous solution containing urea/aluminum sulfide at room temperature for several tens of hours, $Al(OH)_3$ particles having a diameter of several millimeters are precipitated as an alumina precursor in the alginate gel spheres containing urease. These reaction formulae are expressed by the chemical formulae (1) and (2).

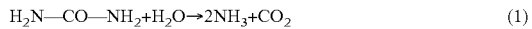

$$H_2N—CO—NH_2+H_2O \rightarrow 2NH_3+CO_2 \quad (1)$$

$$Al^{3+}+3NH_3+3H_2O \rightarrow Al(OH)_3+3NH_4^+ \quad (2)$$

The porous $\alpha$-$Al_2O_3$ particles are then dipped in a solution containing $Y^{3+}$ ions (for example, an aqueous yttrium nitrate solution) to form slurry. The slurry is then placed in a vacuum. The solution containing $Y^{3+}$ ions permeates into pores in the porous $\alpha$-$Al_2O_3$ particles, thus yielding composite slurry of the solution containing $Y^{3+}$ ions and the porous alumina particles.

The composite slurry is then lyophilized to evaporate water in the yttrium nitrate solution contained in the pores, thus yielding a porous 1-$Al_2O_3$ powder impregnated with yttrium nitrate.

The resulting powder is calcined in an atmosphere containing oxygen, for example, in the air at a temperature in the range of 250° C. to 1200° C. to convert yttrium nitrate in the pores into yttrium oxide ($Y_2O_3$), thus yielding a raw material powder composed of the porous $\alpha$-$Al_2O_3$ particles impregnated with $Y_2O_3$. The pores of the porous alumina particles in the raw material powder are mainly constituted of $Y_2O_3$ and voids. Preferably, the raw material powder is further dipped in a solution containing $Y^{3+}$ ions, is placed in a vacuum, is lyophilized, and is heated to produce a raw material powder containing an increased amount of $Y_2O_3$ in the pores.

The raw material powder thus produced may contain $Y_2O_3$ particles disposed out of the pores of the porous $\alpha$-$Al_2O_3$ particles. In this case, the raw material powder is a mixture of the porous $\alpha$-$Al_2O_3$ particles impregnated with $Y_2O_3$ and the $Y_2O_3$ particles.

The raw material powder is then pulverized and, if necessary, is mixed with an organic binder. Furthermore, to achieve a desired composition of a corrosion-resistant member, the raw material powder may be mixed with a trace amount of $Y_2O_3$ powder or $\alpha$-$Al_2O_3$ powder, be pulverized to form a mixed powder, and be, if necessary, mixed with an organic binder.

Subsequently, as described above, the raw material powder or the mixed powder can be molded into a powder compact. The powder compact can be fired to form a corrosion-resistant member according to the present invention.

During the firing of the powder compact, yttrium oxide formed in the pores of the porous alumina particles reacts with part of the porous alumina particles to form YAG particles, which are further sintered. The YAG particles are sintered in portions corresponding to the pores of the porous alumina particles. The YAG particles therefore grow in a restricted manner and form fine crystals. The fine crystals can be highly dispersed over the entire corrosion-resistant member.

As the sintering of the corrosion-resistant member proceeds further, the $\alpha$-$Al_2O_3$ particles come into contact with the fine YAG crystals to form sintered crystals. Consequently, the lattices of the $\alpha$-$Al_2O_3$ crystals and the YAG crystals match closely with each other near the boundaries between the $\alpha$-$Al_2O_3$ crystals and the YAG crystals. This is believed to increase the proportion of Al atoms and (oxygen) atoms that are contained in the $\alpha$-$Al_2O_3$ crystals in contact with YAG crystals and that also serve as Al atoms and O (oxygen) atoms contained in the YAG crystals, in the vicinity of the boundaries between the $\alpha$-$Al_2O_3$ crystals and the YAG crystals. More specifically, the proportion of YAG crystals in contact with $\alpha$-$Al_2O_3$ crystals can be at least 70%. Furthermore, because the sintering is completed while the lattices are well matched, the resulting sintered body has reduced internal stress of the $\alpha$-$Al_2O_3$ crystals, which acts on the peripheries of the boundaries. This improves the corrosion resistance of $\alpha$-$Al_2O_3$ crystals in contact with YAG crystals, and reduces the occurrence of particles. Thus, a corrosion-resistant member having a high corrosion resistance can be manufactured.

As an example of a treatment apparatus according to the present invention, an inductively coupled plasma etching apparatus is described below with reference to a schematic cross-sectional view illustrated in FIG. 6.

Figure 6:
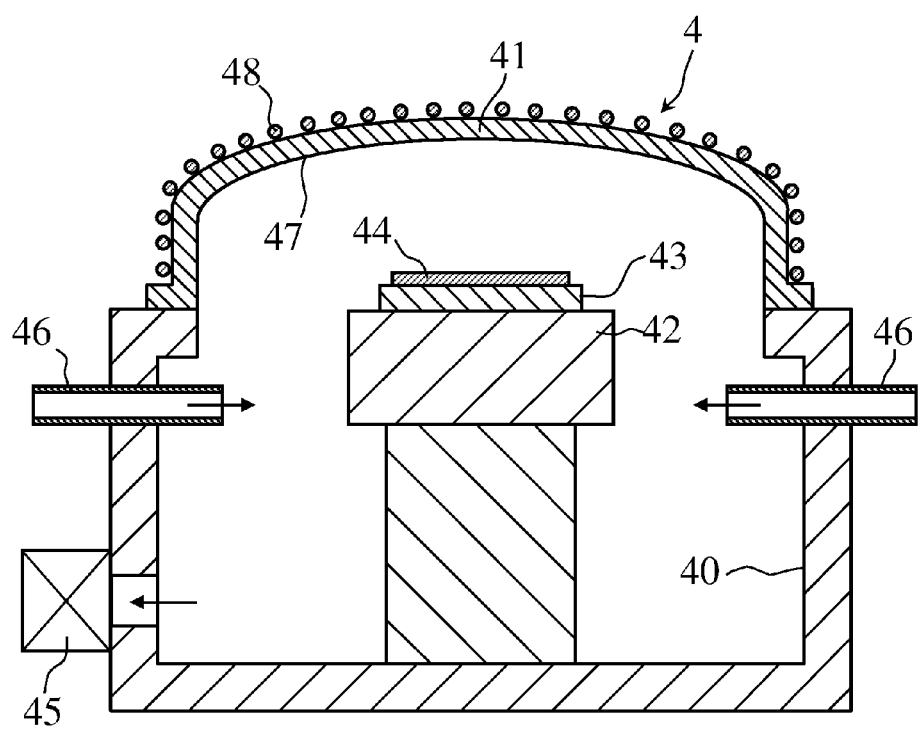
FIG. 6 is a schematic cross-sectional view illustrating an inductively coupled plasma etching apparatus as an example of a treatment apparatus.

An inductively coupled plasma etching apparatus 4 illustrated in FIG. 6 includes a lower chamber 40 and a lid 41. The lower chamber 40 and the lid 41 constitute a treatment container.

A supporting table 42 and an electrostatic chuck 43 are disposed in the lower chamber 40. The supporting table 42 is coupled to an RF power supply (not shown). The electrostatic chuck 43 is disposed on the supporting table 42. The electrostatic chuck 43 holds a semiconductor wafer 44, which is an object to be etched, by electrostatic force, and has an electrode (not shown). The electrode of the electrostatic chuck 43 is coupled to a direct-current power source (not shown).

The lower chamber 40 is coupled to a vacuum pump 45, which can evacuate the lower chamber 40. The lower chamber 40 is also provided with gas supply nozzles 46. An etching gas, such as a $CF_4$ gas, is supplied over the semiconductor wafer 44 through these gas supply nozzles 46.

The lid 41 can be formed of a corrosion-resistant member according to the present invention. The lid 41 has a rough inner surface 47 and has a dome shape. The lid 41 is configured to cover an upper opening of the lower chamber 40. The lid 41, together with the lower chamber 40, constitutes the treatment container. The lid 41 is surrounded by an induction coil 48, which supplies a radio-frequency. The induction coil 48 is coupled to an RF power supply (not shown). For example, a 13.56 MHz microwave is applied to the dielectric coil 48 from the RF power supply.

In the etching of the semiconductor wafer 44 with the etching apparatus 4, the lower chamber 40 is evacuated to a predetermined degree of vacuum with the vacuum pump 45. The semiconductor wafer 44 is then electrostatically adsorbed on the electrostatic chuck 43 (mounting process). Subsequently, while an etching gas is supplied through the gas supply nozzles 46, the RF power supply supplies electricity to the induction coil 48. Thus, an etching gas plasma is generated over the semiconductor wafer 44. The semiconductor wafer 44 is etched in a predetermined pattern (treatment process). Furthermore, the supplying of electricity to the supporting table 42 from the radio-frequency power source can increase the anisotropy of etching. Finally, the semiconductor wafer 44 is removed from the etching apparatus 4 to provide the etched semiconductor wafer 44 (removal process). Furthermore, the supplying of electricity to the supporting table 13 from the radio-frequency power source can increase the anisotropy of etching. Finally, the semiconductor wafer 44 is removed from the etching apparatus 4 to provide the etched semiconductor wafer 44 (removal process).

In such an etching process, the inner surface 47 of the lid 41 comes into contact with a corrosive species, such as a $CF_4$ gas or its plasma. Use of the lid 41 formed of a corrosion-resistant member according to the present invention can increase the life of the container, as compared with an alumina treatment container. In treatment of a sample, such as the semiconductor wafer 44, with the etching apparatus 4, the reduction in corrosion of the lid 41 by a corrosive gas or its plasma can reduce the occurrence of particles from the lid 41. This can prevent the particles from attaching to a sample, such as the semiconductor wafer 44, and producing defectives, thus improving the yield.

As a matter of course, in addition to the lid 41, a corrosion-resistant member according to the present invention can also be applied to members constituting the lower chamber 40, the supporting table 42, and the electrostatic chuck 43, as well as a ring (not shown) for holding the semiconductor wafer 44 on the electrostatic chuck 43. Because a corrosion-resistant member according to the present invention has a high corrosion resistance and high mechanical properties, the application of the corrosion-resistant member to these members can increase the life of the apparatus, reduce the frequency of maintenance, and eliminate the replacement of the members, thus greatly reducing the manufacturing costs of semiconductors.

Furthermore, in addition to the lid 41 of the plasma etching apparatus 4 illustrated in FIG. 6, a corrosion-resistant member according to the present invention can be used as a component for use in treatment apparatuses using a corrosive gas, for example, etching apparatuses having an another structure, and coating apparatuses, such as CVD apparatuses. More specifically, a corrosion-resistant member according to the present invention can be used as components in semiconductor manufacturing apparatuses and liquid crystal manufacturing apparatuses, such as inner wall materials (chambers), microwave transparent windows, showerheads, focus rings, shield rings, clamping rings, and electrostatic chucks, or as components in cryopumps and turbo-molecular pumps for producing a high vacuum in etching apparatuses or CVD apparatuses.

As a matter of course, the present invention is not limited to the corrosion-resistant members and the methods for manufacturing the corrosion-resistant member described above, and may be applied to their modifications without departing from the gist of the present invention.

EXAMPLE 1

The present example examined the relationship between the Al content (expressed in terms of $Al_2O_3$) and the Y content (expressed in terms of $Y_2O_3$) in a corrosion-resistant member, and the ratio $I_{116}/I_{104}$ of the peak intensity assigned to a (116) plane to the peak intensity assigned to a (104) plane in X-ray diffraction of $\alpha\text{-}Al_2O_3$ at a corrosion-resistant surface of the member. The present example further examined the relationship between the Al content and the Y content, and the density, the four-point bending strength, or the corrosion resistance.

<Preparation of Sample>

First, an $\alpha\text{-}Al_2O_3$ powder and an $Y_2O_3$ powder were prepared as primary raw materials. The $\alpha\text{-}Al_2O_3$ powder was prepared by further pulverizing a commercially available $\alpha\text{-}Al_2O_3$ raw material with a vibrating mill. The $\alpha\text{-}Al_2O_3$ powder had a purity of at least 99.5% and an average grain size of 0.8 μm. The $Y_2O_3$ powder was a commercially available powder having a purity of 99.9% and an average grain size of 2 μm.

The $\alpha\text{-}Al_2O_3$ powder and the $Y_2O_3$ powder were mixed at a desired ratio. The mixture was further mixed with 1% by mass of PVA, which serves as a binder, and 0.3% by mass, in terms of MgO, of magnesium hydroxide, which serves as magnesium oxide. After water was added to the mixture, the mixture was blended in a ball mill for 50 hours to form slurry.

After the slurry was collected from the ball mill, the slurry was dried with a spray drier to produce a secondary raw material. Subsequently, the secondary raw material was pressed at 1 t/cm$^2$ by a metal-mold press-forming method to form a powder compact. The powder compact was fired at a temperature of 1630° C., a heating rate of 50° C./h, and a rate of cooling to 1000° C. of 20° C./h. The sintered body was then subjected to surface-grinding. Thus, samples Nos. 1 to 8 used in the present example were prepared.

Samples for use in the evaluation of the peak intensity ratio and the corrosion resistance were discs having an outer diameter of 50 mm and a thickness of 10 mm. Samples for use in the evaluation of the density and the four-point bending test had a bending test piece size (3 mm×4 mm×length 45 mm) according to JIS standards. Thirty bending test pieces were prepared for each of the samples No. 1 to No. 8.

Furthermore, as comparative examples, discoidal samples and samples having a bending test piece size, each formed of sintered alumina ($\alpha\text{-}Al_2O_3$ having a purity of 99.5%) (Comparative Example 1), sintered YAG (purity 99.8w, $Y_3Al_5O_{12}$) (Comparative Example 2), or sintered yttria (purity 99.8%, $Y_2O_3$) (Comparative Example 3), were prepared in the same way.

<Measurement Method of Peak Intensity Ratio $I_{116}/I_{104}$>

The peak intensity ratio $I_{116}/I_{104}$ was determined from a diffraction chart obtained in X-ray diffraction measurement of a surface of a discoidal sample with an X-ray diffractometer (Rigaku Corporation, RINT1400V type). More specifically, the peak intensity $I_{116}$ assigned to a (116) plane and the peak intensity $I_{104}$ assigned to a (104) plane in X-ray diffraction of $\alpha$-$Al_2O_3$ were determined from the diffraction chart. The peak intensity ratio $I_{116}/I_{104}$ was calculated from the ratio of the peak intensities. Table 1 shows the calculated result of the peak intensity ratio $I_{116}/I_{104}$ for samples No. 1 to No. 8.

<Measurement of Density>

The density of the samples No. 1 to No. 8 having a bending test piece size was measured using Archimedes' principle. Table 1 shows the measurements of the density.

<Measurement of Four-Point Bending Strength>

The four-point bending strength of the samples No. 1 to No. 8 having a bending test piece size was measured according to JIS R1601-1995. The four-point bending strength of 30 test specimens was measured for each of the samples No. 1 to No. 8 having different compositions. Table 1 shows the mean value of the measurements.

<Evaluation of Corrosion Resistance>

The corrosion resistance was determined as follows: each of the discoidal samples No. 1 to No. 8 was placed in a reactive ion etching (RIE) apparatus and was exposed to a plasma in an atmosphere of a $Cl_2$ gas for three hours, and the corrosion resistance was determined as an etching rate per minute (angstrom/min) from the weight loss by the etching. Table 1 shows the etching rate as a relative value (etching rate ratio). The etching rate of the sintered alumina of Comparative Example 1 having a purity of 99.5w was taken as 1.

bending strength and fracture toughness) and the corrosion resistance were evaluated. The average grain sizes of the $\alpha$-$Al_2O_3$ crystals and the YAG crystals, their ratios, and the densities of the samples No. 9 to No. 28 were also evaluated.

Samples for use in the measurement of average grain size and the evaluation of corrosion resistance were discs having an outer diameter of 50 mm and a thickness of 10 mm. Samples for use in the evaluation of the density and the mechanical properties had a bending test piece size (3 mm×4 mm×length 45 mm) according to JIS standards. Sixty bending test pieces were prepared for each of the samples No. 1 to No. 8.

Furthermore, as comparative examples, discoidal samples and samples having a bending test piece size, each formed of sintered alumina ($\alpha$-$Al_2O_3$ having a purity of 99.5%) (Comparative Example 4), sintered yttria (purity 99.8%, $Y_2O_3$) (Comparative Example 5), or, sintered YAG (purity 99.8%, $Y_3Al_5O_{12}$) (Comparative Example 6) were prepared.

<Measurement of Average Grain Size>

The average grain size was determined as follows: after a surface of a discoidal sample was chemically etched, a photograph of the surface was taken in an SEM analysis, the crystal grain sizes of a plurality of $\alpha$-$Al_2O_3$ crystals and YAG crystals were measured from the SEM photograph, and the average grain size was calculated as the mean value of the

TABLE 1

| Sample No. | $\alpha$-$Al_2O_3$ content (mass %) | $Y_2O_3$ content (mass %) | X-ray diffraction peak intensity ratio $I_{116}/I_{104}$ | Density (g/cm³) | Four-point bending strength (MPa) | Etching rate ratio |
|---|---|---|---|---|---|---|
| *1 | 99 | 1 | 0.89 | 3.91 | 283 | 0.93 |
| 2 | 98 | 2 | 0.94 | 3.95 | 310 | 0.80 |
| 3 | 97 | 3 | 0.98 | 3.95 | 310 | 0.78 |
| 4 | 95 | 5 | 1.15 | 3.98 | 380 | 0.75 |
| 5 | 90 | 10 | 1.21 | 4.04 | 425 | 0.74 |
| 6 | 80 | 20 | 1.52 | 4.13 | 403 | 0.69 |
| 7 | 70 | 30 | 1.98 | 4.24 | 390 | 0.65 |
| *8 | 69 | 31 | 2.02 | 4.26 | 300 | 0.53 |
| Comparative Example 1 | 99.5 | — | 0.89 | 3.88 | 420 | 1.00 |
| Comparative Example 2 | 42.8 | 57.2 | — | 4.50 | 250 | 0.40 |
| Comparative Example 3 | — | 99.8 | — | 4.92 | 180 | 0.38 |

1. *indicates outside of the scope of the present invention.
2. Each sample contains 5000 ppm or less of inevitable impurities.

<Discussion of Experimental Results>

Table 1 shows that the samples No. 2 to No. 7, which fall within the scope of the present invention, have good mechanical properties and a high corrosion resistance.

In contrast, the sample No. 1, which is outside the scope of the present invention, a low YAG content resulted in a low corrosion resistance. Furthermore, in the sample No. 8, a high YAG content resulted in a high corrosion resistance but poor mechanical properties.

Table 1 also shows that the $I_{116}/I_{104}$ increased with increasing $Y_2O_3$ content under the same manufacturing conditions.

EXAMPLE 2

In the present example, samples No. 9 to No. 28 had the same composition as the sample No. 5 in Example 1, and the average particle size of the primary raw material $\alpha$-$Al_2O_3$ was controlled so that the peak intensity ratio $I_{116}/I_{114}$ had the value show in Table 2. The mechanical properties (four-point crystal grain sizes. Table 2 shows the measurements of the average grain size. Table 2 also shows the calculation of the ratio of the average particle size of $\alpha$-$Al_2O_3$ crystals to the average particle size of YAG crystals.

<Measurement of Density>

The density of samples having a bending test piece size was measured with using Archimedes' principle in the same manner as Example 1. Table 2 shows the measurements of the density.

<Measurement of Mechanical Properties>

The mechanical properties were evaluated as the four-point bending strength and the fracture toughness. The four-point bending strength was measured in the same manner as Example 1. The fracture toughness of a sample having a bending test piece size was measured according to JIS R1607-1995. The four-point bending strength and the fracture toughness of 30 test specimens were measured for each sample. Table 2 shows the mean value of the measurements.

<Evaluation of Corrosion Resistance>

The corrosion resistance was determined as an etching rate (angstrom/min) in the same manner as Example 1. Table 2 shows the etching rate as a relative value (etching rate ratio). The etching rate of the sintered alumina (Comparative Example 4) having a purity of 99.5% was taken as 1.

TABLE 2

| Sample No. | Particle size of $Al_2O_3$ primary raw material (μm) | X-ray diffraction peak intensity ratio $I_{116}/I_{104}$ | Average α-$Al_2O_3$ crystal size (μm) | Average YAG crystal size (μm) | Average YAG crystal size relative to average α-$Al_2O_3$ crystal size (%) | Density (g/cm³) | Four-point bending strength (MPa) | Fracture toughness (MPa · m$^{1/2}$) | Etching rate ratio |
|---|---|---|---|---|---|---|---|---|---|
| *9 | 0.08 | 2.02 | 4 | 1.2 | 30 | 4.04 | 283 | 1.9 | 0.75 |
| 10 | 0.1 | 1.98 | 5.5 | 1.1 | 20 | 4.04 | 425 | 2.7 | 0.75 |
| 11 | 0.8 | 1.75 | 2.9 | 1.3 | 45 | 4.04 | 415 | 2.5 | 0.64 |
| 12 | 1 | 1.56 | 3.5 | 1.3 | 37 | 4.04 | 400 | 2.6 | 0.68 |
| 13 | 1.2 | 1.21 | 10 | 0.5 | 5 | 4.03 | 378 | 2.7 | 0.71 |
| 14 | 1.2 | 1.21 | 5 | 0.5 | 10 | 4.04 | 403 | 2.8 | 0.68 |
| 15 | 1.2 | 1.21 | 0.9 | 0.72 | 80 | 4.04 | 362 | 2 | 0.65 |
| 16 | 1.2 | 1.21 | 1 | 0.4 | 38 | 4.04 | 368 | 2.4 | 0.7 |
| 17 | 1.2 | 1.21 | 1.3 | 0.5 | 38 | 4.04 | 430 | 2.8 | 0.68 |
| 18 | 1.2 | 1.21 | 3.2 | 1.2 | 38 | 4.04 | 424 | 3.1 | 0.61 |
| 19 | 1.2 | 1.21 | 9.2 | 3.5 | 38 | 4.03 | 375 | 2.7 | 0.68 |
| 20 | 1.2 | 1.21 | 6.1 | 3.5 | 57 | 4.04 | 390 | 2.6 | 0.66 |
| 21 | 1.2 | 1.21 | 4.4 | 3.5 | 80 | 4.04 | 395 | 2.4 | 0.63 |
| 22 | 1.2 | 1.21 | 4.1 | 3.5 | 85 | 4.03 | 355 | 2 | 0.75 |
| 23 | 1.2 | 1.21 | 9.6 | 5 | 52 | 4.04 | 385 | 2.7 | 0.62 |
| 24 | 1.2 | 1.21 | 10 | 8 | 80 | 4.03 | 370 | 2.6 | 0.64 |
| 25 | 1.2 | 1.21 | 11.1 | 9 | 81 | 4.03 | 345 | 2 | 0.68 |
| 26 | 1.2 | 1.21 | 21.3 | 8.5 | 40 | 4.02 | 340 | 2.2 | 0.71 |
| 27 | 1.5 | 0.94 | 4.8 | 1.2 | 25 | 4.04 | 350 | 2.8 | 0.73 |
| *28 | 1.7 | 0.86 | 4.3 | 1.5 | 35 | 4.04 | 295 | 3.5 | 0.78 |
| Comparative Example 4 | 1 | 0.87 | 5 | — | — | 3.9 | 280 | 4.5 | 1 |
| Comparative Example 5 | — | — | — | — | — | 4.9 | 130 | 1.5 | 0.4 |
| Comparative Example 6 | — | — | — | 4.5 | — | 4.5 | 250 | 1.5 | 0.4 |

*indicates outside of the scope of the present invention.

<Discussion of Experimental Results>

Table 2 shows that the samples No. 10 to No. 27 within the scope of the present invention had high mechanical properties and a high corrosion resistance, as compared with the samples No. 9 and No. 28 outside the scope of the present invention.

In particular, the samples No. 13 to No. 26, which had a peak intensity ratio $I_{116}/I_{104}$ of 1.21 or less, had a high mechanical strength. Furthermore, among the samples No. 13 to No. 26, which had a peak intensity ratio $I_{116}/I_{104}$ of 1.21 or less, the samples No. 14 to No. 21, No. 24, and No. 2, in which the average grain size of YAG crystals was in the range of 10% to 80% of the average grain size of α-$Al_2O_3$ crystals, had a tendency to have further improved mechanical properties, and the samples No. 16 to No. 25, which had an average grain size of α-$Al_2O_3$ crystals in the range of 1 to 10 μm and an average grain size of YAG crystals in the range of 0.5 to 8 μm, had a fracture toughness as high as 2.4 MPa·m$^{1/2}$ or more, and had further excellent mechanical properties.

In contrast, in a sample No. 9, a peak intensity ratio $I_{116}/I_{104}$ as high as 2.02 resulted in mechanical properties (four-point bending strength and fracture toughness) inferior to those of other samples, and almost identical to those of the sample of Comparative Example 4.

Furthermore, in a sample No. 28, a peak intensity ratio $I_{116}/I_{104}$ as low as 0.86 resulted in a high fracture toughness but a low four-point bending strength, and almost the same mechanical properties as the sample of Comparative Example 4.

EXAMPLE 3

The present example examined the effects of the pressure and the cooling rate of a furnace in a firing process on the corrosion resistance. The present example also examined the percentage of Y element, the presence of a $MgAl_2O_4$ phase, and the four-point bending strength.

<Preparation of Sample>

A powder compact to form a sample was formed in the same manner as Example 1 using a material having the same composition as the sample No. 2 of Example 1. The powder compact was fired in a furnace at the atmospheric pressure or a pressure of 1.2 atm. The heating rate was 30° C./h, and the holding temperature of firing was 1650° C. The rate of cooling from the holding temperature to 1000° C. was 30° C./h, 50° C./h, 100° C./h, or 150° C./h for each pressure. Thus, samples No. 29 to No. 37 were prepared.

Samples for use in determination of mass percentage of Y element, presence of a $MgAl_2O_4$ phase, and evaluation of corrosion resistance were discs having an outer diameter of 50 mm and a thickness of 10 mm. Samples for use in the L evaluation of the four-point bending test had a bending test piece size (3 mm×4 mm×length 45 mm) according to JIS standards. Thirty bending test pieces were prepared for each of the samples No. 29 to No. 37.

<Mass Percentage of Y Element>

The mass percentage of Y element was determined with an energy dispersive X-ray spectrometer for mirror-finished surfaces of samples No. 29 to No. 37 prepared by lapping. More specifically, a grain boundary at a measuring point was first observed with a transmission electron microscope (TEM) under high magnification. The spot diameter of electron beam emitted from the energy dispersive X-ray spectrometer was then set to be in the range of 0.5 to 5 nm. The grain boundary observed by the TEM was irradiated with an electron beam to count the number of Y elements present at the grain boundary. The mass percentage of Y element was determined from the molecular weight on the basis of the count of Y elements. Table 3 shows the mass percentage of Y element thus determined.

<Presence of a $MgAl_2O_4$ Phase>

The presence of a $MgAl_2O_4$ phase was determined by the X-ray diffraction measurement of surfaces of the samples No. 29 to No. 37. Table 3 shows the results.

<Measurement of Four-Point Bending Strength>

The four-point bending strength of the samples having a bending test piece size was measured according to JIS R1601-1995 in the same manner as Example 1. The four-point bending strength of 30 test specimens was measured for each of the samples. Table 3 shows the mean value of the measurements.

<Evaluation of Corrosion Resistance>

The corrosion resistance was determined as an etching rate (angstrom/min) in the same manner as Example 1. Table 3 shows the etching rate as a relative value (etching rate ratio). The etching rate of the sintered alumina (Comparative Example 1) having a purity of 99.5% in the EXAMPLE 1 was taken as 1.

TABLE 3

| Sample No. | Furnace pressure | Cooling rate (° C./h) | Mass percentage of Y element (mass %) | Presence of MgAl2O4 phase | Four-point bending strength (MPa) | Etching rate ratio |
|---|---|---|---|---|---|---|
| 29 | Atmospheric pressure | 30 | 0.09 | Yes | 415 | 0.8 |
| 30 | Atmospheric pressure | 50 | 0.05 | Yes | 420 | 0.82 |
| 31 | Atmospheric pressure | 100 | 0.02 | Yes | 445 | 0.85 |
| 32 | Atmospheric pressure | 150 | Not detected | No | 310 | 0.91 |
| 33 | 1.2 atm | 30 | 30 | Yes | 320 | 0.71 |
| 34 | " | 50 | 17.5 | Yes | 345 | 0.75 |
| 35 | " | 100 | 5.1 | Yes | 380 | 0.79 |
| 36 | " | 100 | 0.1 | Yes | 405 | 0.81 |
| 37 | " | 150 | 0.03 | Yes | 420 | 0.83 |

<Discussion of Experimental Results>

Table 2 shows that the samples No. 33 to No. 36 fired at a pressure of 1.2 atm and a cooling rate of 100° C./h or less had a mass percentage of Y element at the grain boundary in the range of 0.1% to 30% by mass and a low etching rate ratio. This demonstrated that the internal pressure of the furnace of 1.2 atm and the cooling rate of 100° C./h or less could improve the corrosion resistance of a sintered body.

In contrast, as shown in Table 2, in the sample No. 32 fired at a furnace pressure of the atmospheric pressure and a rate of cooling to 1000° C. of 150° C./h, no Y element was detected at the grain boundary. This is because a compound containing an Y element was not crystallized at the excessively large cooling rate. The sample No. 32 had a high etching rate ratio and a low corrosion resistance. Furthermore, the samples No. 29 to No. 31, which were fired at a furnace pressure of the atmospheric pressure and a rate of cooling to 1000° C. of 100° C./h or less, had a small mass percentage of Y element at the grain boundary, a high etching rate ratio, and a low corrosion resistance.

Furthermore, the sample No. 37 fired at a furnace pressure of 1.2 atm and a cooling rate of 150° C./h had a mass percentage of Y element at the grain boundary as low as 0.03% by mass, a high etching rate ratio, and a low corrosion resistance.

EXAMPLE 4

The present example examined the effects of the shape of YAG crystals on the corrosion resistance. The present example also evaluated other properties described below (see Table 5).

<Preparation of Sample>

Samples No. 38 to No. 63 in the present example were prepared substantially in the same manner as Example 1 except the ratio of $\alpha$-$Al_2O_3$ powder and $Y_2O_3$ powder (content ratio by mass) in the mixture, the shape of $Y_2O_3$ powder (aspect ratio) and the additive amount (content) of magnesium hydroxide which serves as magnesium oxide. These are shown in Table 4.

Samples for use in the evaluation of mechanical properties had a bending test piece size (3 mm×4 mm×length 45 mm) according to JIS standards. Thirty bending test pieces were prepared for each of the samples having different compositions. Samples for use in the evaluation other than mechanical properties were discs having an outer diameter of 50 mm and a thickness of 10 mm.

<Measurement of Average Grain Size>

The average grain size was calculated in the same manner as Example 2, using SEM photograph of a chemically etched surface of a sample. Table 4 shows the average grain sizes of $\alpha$-$Al_2O_3$ crystals and YAG crystals.

<Shape, Occupied Area, and Number of YAG Crystals>

The shape, the occupied area, and the number of YAG crystals were observed from an SEM photograph with a magnification of 1000. The number of YAG crystal YAG particles was observed as the number of particles in a 20 μm×20 μm area in each sample. Table 5 shows the measurements of the shape, the occupied area, and the number of YAG crystals.

<Peak Intensity Ratio $I_{116}/I_{104}$>

The peak intensity ratio $I_{116}/I_{104}$ was determined from a diffraction chart obtained in X-ray diffraction measurement of a discoidal sample, as described in Example 1. Table 5 shows the calculation of the peak intensity ratio $I_{116}/I_{104}$ for samples No. 38 to No. 63.

<Determination of Occupied Area Percentage of Open Pores>

The occupied area percentage of open pores was determined by SEM image analysis at a magnification of 1000 in a 20 μm×20 μm area on a mirror-finished surface of each sample prepared by lapping. Table 5 shows the measurements of the occupied area percentage of open pores.

<Determination of Content of Inevitable Impurities>

The content of inevitable impurities was determined by ICP emission spectrometry. Table 5 shows the results.

<Measurement of Mechanical Properties>

The mechanical properties of samples having a bending test piece size were evaluated as the four-point bending strength and the fracture toughness, in the same manner as Example 2. The four-point bending strength and the fracture toughness of 30 test specimens were measured respectively to calculate mean values. Table 5 shows the mean values of the measurements.

<Evaluation of Corrosion Resistance>

The corrosion resistance was determined as an etching rate (angstrom/min) in the same manner as Example 1. Table 5 shows the etching rate as a relative value (etching rate ratio). The etching rate of the sintered alumina (Comparative Example 1) having a purity of 99.5% in the EXAMPLE 1 was taken as 1.

TABLE 4

| Sample No. | α-Al$_2$O$_3$ Content (mass %) | Y$_2$O$_3$ Content (mass %) | Y$_2$O$_3$ Aspect ratio | MgO content (mass %) |
|---|---|---|---|---|
| 38 | 98 | 2 | 1 | 2 |
| 39 | 98 | 2 | 1.1 | 2 |
| 40 | 98 | 2 | 3 | 2 |
| 41 | 98 | 2 | 2 | 1 |
| 42 | 98 | 2 | 2 | 2 |
| 43 | 98 | 2 | 2 | 2 |
| 44 | 98 | 2 | 2 | 2 |
| 45 | 70 | 30 | 2 | 2 |
| 46 | 98 | 2 | 2 | 2 |
| 47 | 70 | 30 | 2 | 2 |
| 48 | 70 | 30 | 2 | 2 |
| 49 | 70 | 30 | 0.8 | 2 |
| 50 | 80 | 20 | 2 | 2 |
| 51 | 95 | 5 | 2 | 2 |
| 52 | 97 | 3 | 2 | 2 |
| 53 | 98 | 2 | 2 | 2 |
| 54 | 98 | 2 | 2 | 2 |
| 55 | 98 | 2 | 2 | 2 |
| 56 | 98 | 2 | 2 | 2 |
| 57 | 98 | 2 | 2 | 1 |
| 58 | 98 | 2 | 2 | 2 |
| 59 | 98 | 2 | 2 | 0.05 |
| 60 | 98 | 2 | 2 | 0.07 |
| 61 | 98 | 2 | 2 | 1 |
| 62 | 98 | 2 | 2 | 2 | crystals and YAG crystals were 0.5 to 8 μm and 1 to 10 μm, respectively, the occupied area percentages of YAG crystals were at least 2%, and the percentages of open pores were 2% or less, had excellent mechanical properties, as indicated by a four-point bending strength of at least 370 MPa and a fracture toughness of at least 1.7 MPa·m$^{1/2}$, and a high corrosion resistance, as indicated by an etching rate ratio of 0.85 or less.

In contrast, the sample No. 38, which contained spherical YAG crystals and a lesser amount of Y$_2$O$_3$, had an etching rate ratio as high as at least 0.9 and a low corrosion resistance. Furthermore, the sample No. 49, which contained a large amount of Y$_2$O$_3$ and spherical YAG crystals, had a corrosion resistance inferior to those of the samples No. 47 and No. 48, which contained the same amount of Y$_2$O$_3$ as the sample No. 49.

EXAMPLE 5

The present example examined the relationship between the proportion of YAG crystals in contact with α-Al$_2$O$_3$ crystals, and the mechanical properties (four-point bending strength) and the corrosion resistance.

<Preparation of Sample>

In the preparation of samples, an α-Al$_2$O$_3$ powder, an Y$_2$O$_3$ powder, and a MgO powder serving as a sintering aid were first mixed. A predetermined organic binder and water were then added to the mixture. The mixture was pulverized in a ball mill for 9 to 55 hours and was granulated with a spray drier. The content of MgO powder shown in Table 6 is the percentage of MgO powder to the total of the α-Al$_2$O$_3$ powder and the Y$_2$O$_3$ powder, which is set to be 100% by mass. The size of the pulverized particles of the granulated particles was measured by a laser scattering diffraction method. Table 6 also shows the measurements of the size of the pulverized particles.

TABLE 5

| Sample No. | Average Al$_2$O$_3$ grain size (μm) | YAG Particle shape | YAG Average grain size (μm) | YAG Occupied area percentage (%) | YAG Number of particles (-) | X-ray diffraction peak intensity ratio I$_{116}$/I$_{104}$ | Occupied area percentage of open pores (%) | Inevitable impurities (mass ppm) | Four-point bending strength (MPa) | Fracture toughness (MPa·m$^{1/2}$) | Etching rate |
|---|---|---|---|---|---|---|---|---|---|---|---|
| 38 | 6.0 | Sperical | 5.7 | 2.5 | 10 | 1.48 | 1.8 | 6000 | 380 | 2.0 | 0.95 |
| 39 | 5.3 | wedge-shaped | 6.0 | 3.4 | 11 | 1.63 | 2.6 | 6000 | 370 | 2.0 | 0.85 |
| 40 | 6.2 | wedge-shaped | 5.6 | 3.4 | 9 | 1.55 | 1.8 | 6000 | 370 | 2.5 | 0.78 |
| 41 | 2.8 | wedge-shaped | 2.0 | 3.4 | 14 | 1.95 | 2.0 | 6000 | 400 | 5.0 | 0.77 |
| 42 | 9.0 | wedge-shaped | 2.0 | 3.4 | 13 | 0.94 | 1.8 | 6000 | 370 | 4.5 | 0.79 |
| 43 | 8.0 | wedge-shaped | 0.8 | 1.7 | 5 | 1.10 | 1.9 | 6000 | 370 | 4.5 | 0.85 |
| 44 | 8.0 | wedge-shaped | 0.8 | 2.0 | 5 | 1.10 | 1.8 | 6000 | 370 | 4.5 | 0.81 |
| 45 | 4.0 | wedge-shaped | 12.0 | 43.0 | 78 | 1.76 | 2.0 | 6000 | 370 | 1.7 | 0.46 |
| 46 | 7.0 | wedge-shaped | 2.0 | 1.0 | 10 | 1.34 | 1.8 | 6000 | 380 | 4.3 | 0.79 |
| 48 | 5.2 | wedge-shaped | 7.8 | 42.0 | 43 | 1.65 | 2.0 | 6000 | 380 | 2.1 | 0.55 |
| 49 | 8.0 | wedge-shaped | 1.0 | 43.0 | 75 | 1.08 | 2.5 | 6000 | 380 | 2.0 | 0.51 |
| 50 | 8.0 | Sperical | 1.0 | 42.0 | 75 | 1.08 | 2.5 | 6000 | 380 | 2.0 | 0.65 |
| 51 | 6.2 | wedge-shaped | 6.0 | 31.0 | 62 | 1.58 | 2.5 | 6000 | 380 | 2.5 | 0.61 |
| 52 | 7.0 | wedge-shaped | 1.7 | 5.1 | 21 | 1.30 | 2.6 | 6000 | 380 | 3.3 | 0.83 |
| 53 | 7.5 | wedge-shaped | 1.7 | 3.4 | 15 | 1.29 | 2.5 | 6000 | 380 | 3.8 | 0.85 |
| 54 | 7.7 | wedge-shaped | 1.8 | 3.4 | 14 | 1.25 | 1.6 | 5000 | 390 | 3.9 | 0.82 |
| 55 | 7.7 | wedge-shaped | 1.8 | 3.4 | 15 | 1.24 | 1.5 | 100 | 380 | 3.9 | 0.81 |
| 56 | 6.5 | wedge-shaped | 1.2 | 2.8 | 40 | 1.18 | 2.1 | 5000 | 370 | 2.0 | 0.83 |
| 57 | 8.0 | wedge-shaped | 2.0 | 3.4 | 16 | 1.14 | 1.0 | 6000 | 390 | 3.9 | 0.79 |
| 58 | 8.0 | wedge-shaped | 2.0 | 3.4 | 15 | 1.17 | 1.5 | 6000 | 400 | 3.8 | 0.82 |
| 59 | 7.8 | wedge-shaped | 1.9 | 3.4 | 14 | 1.22 | 2.0 | 6000 | 390 | 3.9 | 0.81 |
| 60 | 7.9 | wedge-shaped | 1.7 | 3.4 | 15 | 1.21 | 1.8 | 6000 | 410 | 4.2 | 0.83 |
| 61 | 8.0 | wedge-shaped | 1.8 | 3.4 | 14 | 1.13 | 1.9 | 6000 | 410 | 4.1 | 0.84 |
| 62 | 8.0 | wedge-shaped | 1.9 | 3.4 | 13 | 1.15 | 2.6 | 6000 | 410 | 4.0 | 0.81 |
| 63 | 8.0 | wedge-shaped | 2.0 | 3.4 | 15 | 1.11 | 2.5 | 6000 | 390 | 3.9 | 0.82 |

<Discussion of Experimental Results>

Table 5 shows that in the samples No. 39 to No. 48 and No. 50 to No. 62, in which YAG crystal grains had a wedge shape, when samples containing the same level of Y$_2$O$_3$ are compared, the etching rate ratio was as low as 0.85 or less, and the corrosion resistance was excellent.

In particular, the samples Nos. 39 to 41, 43 to 47, 53, 54, 56 to 60, and 62, in which the average grain sizes of Al$_2$O$_3$ The granulated powder was charged into a predetermined mold and was pressed to form a powder compact. The powder compact was fired in the air at a temperature of 1650° C. Thus, samples No. 64 to No. 76 were prepared. The heating rate and the cooling rate were 30° C./h and 50° C./h, respectively.

Samples for use in determination of mass percentage of Y element and presence of a $MgAl_2O_4$ phase, and evaluation of corrosion resistance were discs having an outer diameter of 50 mm and a thickness of 10 mm. Samples for use in the evaluation of the four-point bending test had a bending test piece size (3 mm×4 mm×length 45 mm) according to JIS standards. Thirty bending test pieces were prepared for each of the samples No. 64 to No. 76.

<Mass percentage of Y Element>
<Determination of Proportion of YAG Crystals in Contact with $\alpha$-$Al_2O_3$ Crystals>

The proportion of YAG crystals in contact with $\alpha$-$Al_2O_3$ crystals was determined from a photograph of a surface of each sample taken with a scanning electron microscope (SEM). More specifically, among reflected electron images, a backscattered electron image of a surface to be measured was taken with an SEM at a magnification of about 5000. After $\alpha$-$Al_2O_3$ crystals and YAG crystals were distinguished from each other in the SEM photograph, the proportion of YAG crystals in contact with $\alpha$-$Al_2O_3$ crystals to the total YAG crystals was calculated. Because crystals having a grain size of less than 0.1 μm have only limited influence on the corrosion resistance and the mechanical properties, they were eliminated from the calculation.

<Measurement of Four-Point Bending Strength>

The four-point bending strength of the samples having a L bending test piece size was measured according to JIS R1601-1995 in the same manner as Example 1. The four-point bending strength was measured for each of the samples No. 1 to No. 8. The four-point bending strength of 30 test specimens was measured for each of the samples No. 29 to No. 37. Table 6 shows the mean value of the measurements.

<Evaluation of Corrosion Resistance>

The corrosion resistance was determined as an etching rate (angstrom/min) in the same manner as Example 1. Table 6 shows the etching rate as a relative value (etching rate ratio). The etching rate of the sintered alumina (Comparative Example 1) having a purity of 99.5% in the EXAMPLE 1 was taken as 1.

<Discussion of Experimental Results>

Table 5 shows that in the samples No. 65 to No. 69 and No. 71 to No. 74, the YAG crystals were dispersed well, the number of YAG crystals in contact with $\alpha$-$Al_2O_3$ crystals was at least 70w, and the mechanical properties and the corrosion resistance were excellent.

In contrast, in the samples No. 63 and No. 75, in which the content of $Y_2O_3$ powder was outside the scope of the present invention, the number of YAG crystals in contact with $\alpha$-$Al_2O_3$ was less than 70%, and the mechanical properties were poor, as indicated by a four-point bending strength of 325 MPa or less. The sample No. 63, which contained a lesser amount of $Y_2O_3$, had an etching rate ratio as high as 0.97 or more and a low corrosion resistance.

In the sample No. 64, which had a pulverization time as short as nine hours, the size of pulverized particles was large, and the dispersibility of the $Y_2O_3$ powder was poor. In the sample No. 64, the number of YAG crystals in contact with $\alpha$-$Al_2O_3$ crystals after sintering was less than 70%, and the mechanical properties and the corrosion resistance were slightly inferior to other samples.

In the sample No. 70, which had a pulverization time as long as 55 hours, the primary raw material particles were excessively pulverized, and the size of pulverized particles was small. $Y_2O_3$ particles therefore agglomerated in a granulation process, and the dispersibility of YAG crystals 1 after sintering was poor. In the sample No. 70, the number of YAG crystals in contact with $\alpha$-$Al_2O_3$ crystals after sintering was less than 70%, and the mechanical properties and the corrosion resistance were inferior to other samples.

The invention claimed is:

1. A corrosion-resistant member comprising a sintered body that contains $\alpha$-$Al_2O_3$ crystals and YAG (yttrium aluminum garnet) crystals, the content of Al in the sintered body being in the range of 70% to 98% by mass in terms of $Al_2O_3$, the content of Y in the sintered body being in the range of 2% to 30% by mass in terms of $Y_2O_3$,
   wherein the peak intensity ratio $I_{116}/I_{104}$ is in the range of 0.94 to 1.98, wherein $I_{116}$ and $I_{104}$ denote peak intensities assigned to a (116) plane and a (104) plane, respectively, of $\alpha$-$Al_2O_3$ crystals in a surface layer of the sintered body in X-ray diffraction.

2. The corrosion-resistant member according to claim 1, wherein the peak intensity ratio $I_{116}/I_{104}$ is 1.21 or more.

TABLE 6

| Sample No. | $\alpha$-$Al_2O_3$ content (mass %) | $Y_2O_3$ content (mass %) | MgO content (mass %) | Pulverization time (h) | Pulverized particle size (micrometer) | Proportion of YAG crystals in contact with $\alpha$-$Al_2O_3$ (%) | Four-point bending strength (MPa) | Etching rate ratio |
|---|---|---|---|---|---|---|---|---|
| *63 | 99 | 1 | 1 | 30 | 1.1 | 60 | 312 | 0.97 |
| 64 | 98 | 2 | 1 | 9 | 1.5 | 65 | 372 | 0.82 |
| 65 | 98 | 2 | 1 | 10 | 1.4 | 70 | 379 | 0.78 |
| 66 | 98 | 2 | 1 | 20 | 1.3 | 73 | 385 | 0.75 |
| 67 | 98 | 2 | 1 | 30 | 1.2 | 75 | 400 | 0.71 |
| 68 | 98 | 2 | 1 | 40 | 1 | 78 | 410 | 0.68 |
| 69 | 98 | 2 | 1 | 50 | 0.8 | 80 | 425 | 0.65 |
| 70 | 98 | 2 | 1 | 55 | 0.5 | 68 | 302 | 0.95 |
| 71 | 95 | 5 | 1 | 30 | 1.2 | 79 | 375 | 0.8 |
| 72 | 90 | 10 | 1 | 30 | 1.1 | 82 | 389 | 0.75 |
| 73 | 80 | 20 | 1 | 30 | 1 | 86 | 395 | 0.58 |
| 74 | 70 | 30 | 1 | 30 | 1.1 | 90 | 390 | 0.5 |
| *75 | 69 | 31 | 1 | 30 | 1.2 | 68 | 325 | 0.48 |

*indicates outside of the scope of the present invention.

3. The corrosion-resistant member according to claim 1, wherein average grain size of YAG crystals is in the range of 10% to 80% of that of $\alpha$-$Al_2O_3$ crystals.

4. The corrosion-resistant member according to claim 1, wherein average grain size of $\alpha$-$Al_2O_3$ crystals is in the range of 1 μm to 10 μm and average grain size of YAG crystals is in the range of 0.5 μm to 8 μm.

5. The corrosion-resistant member according to claim 1, wherein average grain size of $\alpha$-$Al_2O_3$ crystals is in the range of 1 μm to 10 μm and average grain size of YAG crystals is in the range of 10% to 80% of that of $\alpha$-$Al_2O_3$ crystals.

6. The corrosion-resistant member according to claim 1, wherein the sintered body contains Al, Y, Mg, and O elements at grain boundaries and the mass percentage of Y element at the grain boundaries is in the range of 0.1% to 30% by mass of the total mass of Al, Y, Mg, and O elements.

7. The corrosion-resistant member according to claim 1, wherein $MgAl_2O_4$ is present at grain boundaries.

8. The corrosion-resistant member according to claim 1, wherein YAG crystals have a wedge shape.

9. The corrosion-resistant member according to claim 1, wherein the occupied area percentage of YAG crystals at a surface of the sintered body is at least 2%.

10. The corrosion-resistant member according to claim 1, wherein at least 70% of YAG crystals is in contact with alumina crystals.

11. The corrosion-resistant member according to claim 1, wherein the percentage of open pores at the surface of the sintered body is 2% or less.

12. A treatment apparatus in which a sample placed in a treatment container is subjected to etching or deposition with a corrosive gas or its plasma, the treatment apparatus comprising the corrosion-resistant member, the corrosion-resistant member comprising, a sintered body that contains $\alpha$-$Al_2O_3$ crystals and YAG (yttrium aluminum garnet) crystals, the content of Al in the sintered body being in the range of 70% to 98% by mass in terms of $Al_2O_3$, the content of Y in the sintered body being in the range of 2% to 30% by mass in terms of $Y_2O_3$, wherein the peak intensity ratio $I_{116}/I_{104}$ is in the range of 0.94 to 1.98, wherein $I_{116}$ and $I_{104}$ denote peak intensities assigned to a (116) plane and a (104) plane, respectively, of $\alpha$-$Al_2O_3$ crystals in a surface layer of the sintered body in X-ray diffraction.

13. The treatment apparatus according to claim 12, wherein the peak intensity ratio $I_{116}/I_{104}$ is 1.21 or more.

14. The treatment apparatus according to claim 12, wherein average grain size of YAG crystals is in the range of 10% to 80% of that of $\alpha$-$Al_2O_3$ crystals.

15. The treatment apparatus according to claim 12, wherein average grain size of $\alpha$-$Al_2O_3$ crystals is in the range of 1 μm to 10 μm and average grain size of YAG crystals is in the range of 0.5 μm to 8 μm.

16. The treatment apparatus according to claim 12, wherein at least a part of the treatment container contains the corrosion-resistant member.

* * * * *